United States Patent
Kim et al.

(10) Patent No.: US 10,852,577 B2
(45) Date of Patent: Dec. 1, 2020

(54) DISPLAY DEVICE

(71) Applicant: LG ELECTRONICS INC., Seoul (KR)

(72) Inventors: Geunhwan Kim, Seoul (KR); Minho Kim, Seoul (KR); Sujin Sim, Seoul (KR); Juyoung Joung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/891,280

(22) Filed: Feb. 7, 2018

(65) Prior Publication Data

US 2018/0252963 A1 Sep. 6, 2018

(30) Foreign Application Priority Data

Mar. 3, 2017 (KR) .................. 10-2017-0027962

(51) Int. Cl.
*G02F 1/1335* (2006.01)
*G02F 1/13357* (2006.01)
*F21V 8/00* (2006.01)
*G02F 1/135* (2006.01)

(52) U.S. Cl.
CPC ..... *G02F 1/133514* (2013.01); *G02B 6/0025* (2013.01); *G02F 1/133509* (2013.01); *G02F 1/133602* (2013.01); *G02F 1/133615* (2013.01); *G02F 2001/1351* (2013.01); *G02F 2001/133614* (2013.01); *G02F 2001/133624* (2013.01)

(58) Field of Classification Search
CPC ................................................ G02F 1/133514
See application file for complete search history.

(56) References Cited

U.S. PATENT DOCUMENTS

2005/0212992 A1  9/2005 Nakanishi
2007/0259206 A1* 11/2007 Oshio ................... C04B 35/581
                                                     428/690
(Continued)

FOREIGN PATENT DOCUMENTS

CN    101834266    9/2010
CN    102323692    1/2012
(Continued)

OTHER PUBLICATIONS

European Patent Office Application Serial No. 18158132.3, Search Report dated Jul. 13, 2018, 32 pages.
(Continued)

*Primary Examiner* — Edmond C Lau
(74) *Attorney, Agent, or Firm* — Lee, Hong, Degerman, Kang & Waimey PC

(57) ABSTRACT

A display device is disclosed. The display device comprises: a display panel; an optical assembly providing the display panel with light; and a light absorbing layer positioned on an optical path, the optical path leading to the display panel from the optical assembly, wherein the light provided from the optical assembly to the display panel includes a blue-based light, a green-based light, and a red-based light, wherein an intensity of the green-based light is 25% to 38% with respect to an intensity of the blue-based light 100%, and wherein an intensity of the red-based light is 14% to 32% with respect to the intensity of the blue-based light 100%.

3 Claims, 30 Drawing Sheets

(56) References Cited

U.S. PATENT DOCUMENTS

| | | | | |
|---|---|---|---|---|
| 2009/0190064 | A1* | 7/2009 | Yamada | G02F 1/133514 |
| | | | | 349/61 |
| 2016/0155390 | A1* | 6/2016 | Son | G09G 3/3413 |
| | | | | 345/102 |
| 2017/0146856 | A1 | 5/2017 | Yokota | |
| 2017/0162547 | A1* | 6/2017 | Bergmann | H01L 33/62 |
| 2017/0196060 | A1* | 7/2017 | Watanabe | H01L 25/0753 |
| 2017/0205548 | A1* | 7/2017 | Park | G02F 1/1336 |
| 2017/0358635 | A1* | 12/2017 | Omata | H01L 27/3232 |
| 2018/0088413 | A1* | 3/2018 | Jang | G02F 1/133509 |

FOREIGN PATENT DOCUMENTS

| | | |
|---|---|---|
| CN | 105739170 | 7/2016 |
| CN | 106353912 | 1/2017 |
| EP | 3118674 | 1/2017 |
| JP | 2005183139 | 7/2005 |
| JP | 2007025285 | 2/2007 |
| KR | 1020170088230 | 8/2017 |
| WO | 03/005111 | 1/2003 |
| WO | 2016122284 | 8/2016 |

OTHER PUBLICATIONS

The State Intellectual Property Office of the People's Republic of China Application Serial No. 201810174150.2, Office Action dated Jul. 27, 2020, 6 pages.

* cited by examiner (a)

(b)

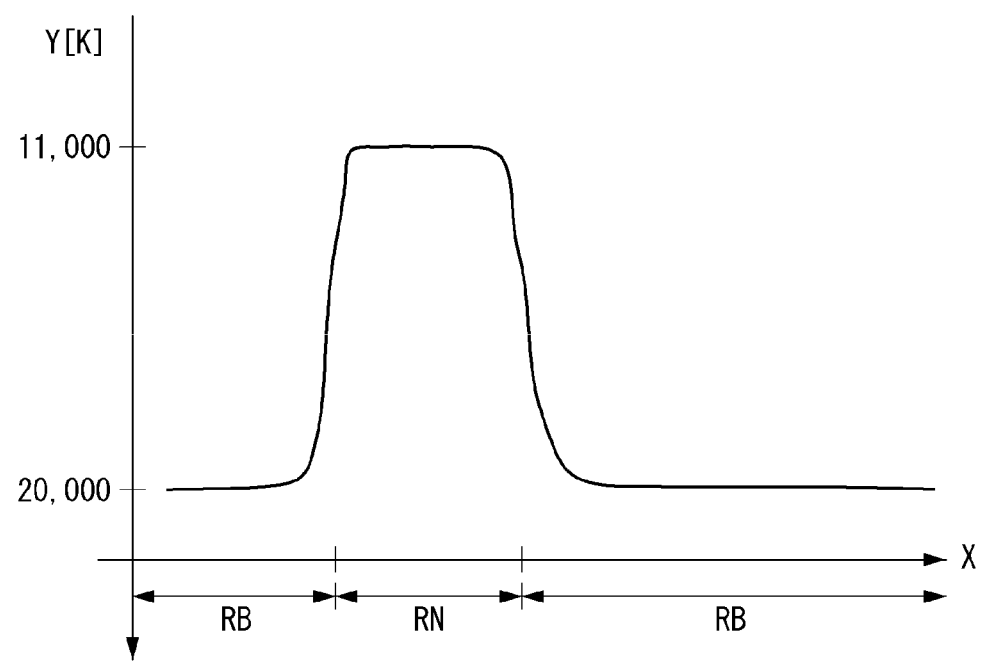

DISPLAY DEVICE

Pursuant to 35 U.S.C. § 119(a), this application claims the benefit of earlier filing date and right of priority to Korean Patent Application No. 10-2017-0027962, filed on Mar. 3, 2017, the contents of which are hereby incorporated by reference herein in its entirety.

BACKGROUND OF THE INVENTION

Field of the Invention

The present invention is related to a display device.

Discussion of the Related Art

As the information society develops, the demand for display devices has been expanded in various forms. In recent years, various display devices such as a liquid crystal display device (LCD), a plasma display panel (PDP), an electro luminescent display (ELD), and a vacuum fluorescent display (VFD) have been studied and used.

The liquid crystal panel of the LCD includes a TFT substrate, a color filter substrate opposed to the TFT substrate, and a liquid crystal layer disposed between the TFT substrate and the color filter substrate, and can display an image by using light provided from the backlight unit.

In recent years, interest in image quality of display devices has increased, and color expression power or color reproduction power close to true color has attracted considerable attention, and much research has been conducted to improve image quality for realizing natural colors.

SUMMARY OF THE INVENTION

Accordingly, an object of the present invention is to address the above-described and other problems.

Another object of the present invention is to provide the display device of which image quality can be enhanced.

Another object of the present invention is to provide the display device of which color reproducibility can be improved.

Another object of the present invention is to provide the display device capable of controlling a wavelength of light supplied from a backlight unit effectively.

According to an aspect of the present invention, there is provided display device comprising: a display panel; an optical assembly providing the display panel with light; and a light absorbing layer positioned on an optical path, the optical path leading to the display panel from the optical assembly, wherein the light provided from the optical assembly to the display panel includes a blue-based light, a green-based light, and a red-based light, wherein an intensity of the green-based light is 25% to 38% with respect to an intensity of the blue-based light 100%, and wherein an intensity of the red-based light is 14% to 32% with respect to the intensity of the blue-based light 100%.

According to another aspect of the present invention, the light absorbing layer may absorb light having a wavelength between 540 nm and 600 nm.

According to another aspect of the present invention, the intensity of the green-based light may be 28% to 36% with respect to the intensity of the blue-based light 100%, the intensity of the red-based light may be 19% to 26% with respect to the intensity of the blue-based light 100%.

According to another aspect of the present invention, the light absorbing layer may include Tetra Aza Porphyrin.

According to another aspect of the present invention, the display panel may include: a front substrate; a rear substrate opposite to the front substrate; and a color filter positioned between the front substrate and the rear substrate, the light absorbing layer may be located or formed on a front surface of the front substrate.

According to another aspect of the present invention, the display device may further comprise: a light guide plate positioned at a rear of the display panel; and an optical sheet positioned between the display panel and the light guide plate, the optical assembly may provide with the light towards a lateral side of the light guide plate.

According to another aspect of the present invention, the optical assembly may include: a light source providing with the blue-based light; an encapsulant covering the light source; and yellow and red fluorescent substances disposed in the encapsulant, a mixing ratio of the yellow fluorescent substance to the red fluorescent substance may be 0.42~0.62:0.37~0.57.

According to another aspect of the present invention, a first mixing ratio of the yellow fluorescent substance to a sum of yellow and red fluorescent substances may be 0.42~0.62, a second mixing ration of the red fluorescent substance to the sum of yellow and red fluorescent substances may be 0.37~0.57, and a sum of the first and second mixing ration may be 1.

According to another aspect of the present invention, the optical assembly may include: a light source providing with the blue-based light; an encapsulant covering the light source; and yellow and red fluorescent substances disposed in the encapsulant, a mixing ratio of the yellow fluorescent substance to the red fluorescent substance may be 1:0.93.

According to another aspect of the present invention, the optical assembly may include: a light source providing with the blue-based light; an encapsulant covering the light source; and yellow and red fluorescent substances disposed in the encapsulant, a content ratio of the yellow and red fluorescent substances to the encapsulant may be 4.2%~6.8%.

According to another aspect of the present invention, a color temperature of an image provided from the display panel may be 10,000K~12,000K.

According to at least one of embodiments of the present invention, image quality of the display device can be enhanced.

According to at least one of embodiments of the present invention, color reproducibility of the display device can be enhanced.

According to at least one of embodiments of the present invention, the wavelength of the light supplied from the backlight unit can be controlled effectively.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 29 is a view illustrating an example of a color temperature of light provided by a display device according to an embodiment of the present invention.

DETAILED DESCRIPTION OF THE EMBODIMENTS

Figure 1:
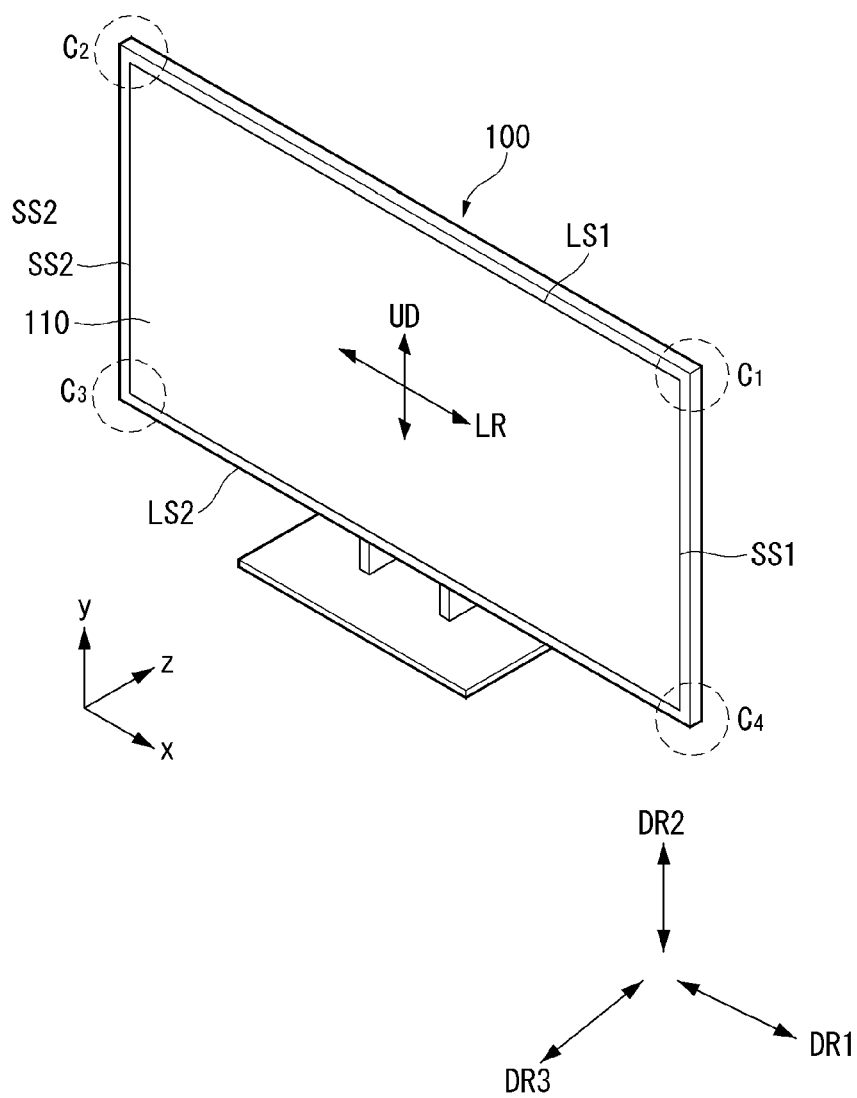
FIGS. 1 to 9 are views showing a display device related to the present invention.

Reference will now be made in detail embodiments of the invention examples of which are illustrated in the accompanying drawings. Since the present invention may be modified in various ways and may have various forms, specific embodiments are illustrated in the drawings and are described in detail in the present specification. However, it should be understood that the present invention are not limited to specific disclosed embodiments, but include all modifications, equivalents and substitutes included within the spirit and technical scope of the present invention.

The terms 'first', 'second', etc. may be used to describe various components, but the components are not limited by such terms. The terms are used only for the purpose of distinguishing one component from other components. For example, a first component may be designated as a second component without departing from the scope of the present invention. In the same manner, the second component may be designated as the first component.

The term "and/or" encompasses both combinations of the plurality of related items disclosed and any item from among the plurality of related items disclosed.

When an arbitrary component is described as "being connected to" or "being linked to" another component, this should be understood to mean that still another component (s) may exist between them, although the arbitrary component may be directly connected to, or linked to, the second component. In contrast, when an arbitrary component is described as "being directly connected to" or "being directly linked to" another component, this should be understood to mean that no component exists between them.

The terms used in the present application are used to describe only specific embodiments or examples, and are not intended to limit the present invention. A singular expression can include a plural expression as long as it does not have an apparently different meaning in context.

In the present application, the terms "include" and "have" should be understood to be intended to designate that illustrated features, numbers, steps, operations, components, parts or combinations thereof exist and not to preclude the existence of one or more different features, numbers, steps, operations, components, parts or combinations thereof, or the possibility of the addition thereof.

Unless otherwise specified, all of the terms which are used herein, including the technical or scientific terms, have the same meanings as those that are generally understood by a person having ordinary knowledge in the art to which the present invention pertains. The terms defined in a generally used dictionary must be understood to have meanings identical to those used in the context of a related art, and are not to be construed to have ideal or excessively formal meanings unless they are obviously specified in the present application.

The following exemplary embodiments of the present invention are provided to those skilled in the art in order to describe the present invention more completely. Accordingly, shapes and sizes of elements shown in the drawings may be exaggerated for clarity.

FIGS. 1 to 9 are drawings showing a display device related to the present invention.

Hereinafter, a liquid crystal display device (LCD) will be described as an example of the display panel, but the display panel applicable to the present invention may not be limited to the liquid crystal panel.

The display device 100 may include a first long side LS1 and a second long side LS2 opposite to the first long side LS1. The display device 100 may include a first short side SS1 and a second short side SS2 opposite to the first short side SS1. The first short side SS1 may be adjacent to both the first long side LS1 and the second long side LS2.

An area adjacent to the first short side SS1 may be referred to as a first short side area SS1. An area adjacent to the second short side SS2 may be referred to as a second short side area SS2. An area adjacent to the first long side LS1 may be referred to as a first long side area LS1. An area adjacent to the second long side LS2 may be referred to as a second long side area LS2. The first short side area SS1 may be referred to as a first side area. The second short side area SS2 may be referred to as a second side area. The first long side area LS1 may be referred to as a third side area. The second long side area LS2 may be referred to as a fourth side area.

The lengths of the first and second long sides LS1 and LS2 may be longer than the lengths of the first and second short sides SS1 and SS2 for the convenience of explanation. It is also possible that the lengths of the first and second long sides LS1 and LS2 are substantially equal to the lengths of the first and second short sides SS1 and SS2.

The display device 100 may include a display panel 110 for displaying an image. The display panel 110 may form a front surface of the display device 100. The display panel 110 can display an image toward the front of the display device 100. The first direction DR1 may be a direction along to the long sides LS1 and LS2 of the display device 100. The second direction DR2 may be a direction along to the short sides SS1 and SS2 of the display device 100.

The third direction DR3 may be a direction normal to the first direction DR1 and/or the second direction DR2.

The first direction DR1 and the second direction DR2 may collectively be referred to as a horizontal direction. In addition, the third direction DR3 may be referred to as a vertical direction.

A side on which the display device 100 displays the image may be referred to as a 'forward direction' or a 'front side' of the display device 100. A side on which the image cannot be viewed may be referred to as a 'rearward direction' or a 'rear side' of the display device 100. From the viewpoint of the front side of the display device 100, the first long side LS1 may be referred to as an upper side or an upper surface, the second long side LS2 side may be referred to as a lower side or a lower surface, the first short side SS1 may be referred to as a right side or the right surface, and the second short side SS2 may be referred to as a left side or a left surface.

The first long side LS1, the second long side LS2, the first short side SS1 and the second short side SS2 may be referred to as an edge of the display device 100. The area where the first long side LS1, the second long side LS2, the first short side SS1, and the second short side SS2 meet with each other may be referred to as a corner. For example, the area where the first long side LS1 and the first short side SS1 meet may be referred to as a first corner C1. The area where the first long side LS1 and the second short side SS2 meet may be referred to as a second corner C2. The area where the second short side SS2 and the second long side LS2 meet may be referred to as a third corner C3. The area where the second long side LS2 and the first short side SS1 meet may be referred to as a fourth corner C4.

The direction from the first short side SS1 to the second short side SS2 or the direction from the second short side SS2 to the first short side SS1 may be referred to as the left and right direction LR. The direction from the first long side LS1 to the second long side LS2 or the direction from the second long side LS2 to the first long side LS1 may be referred to as the up and down direction UD.

Figure 2:
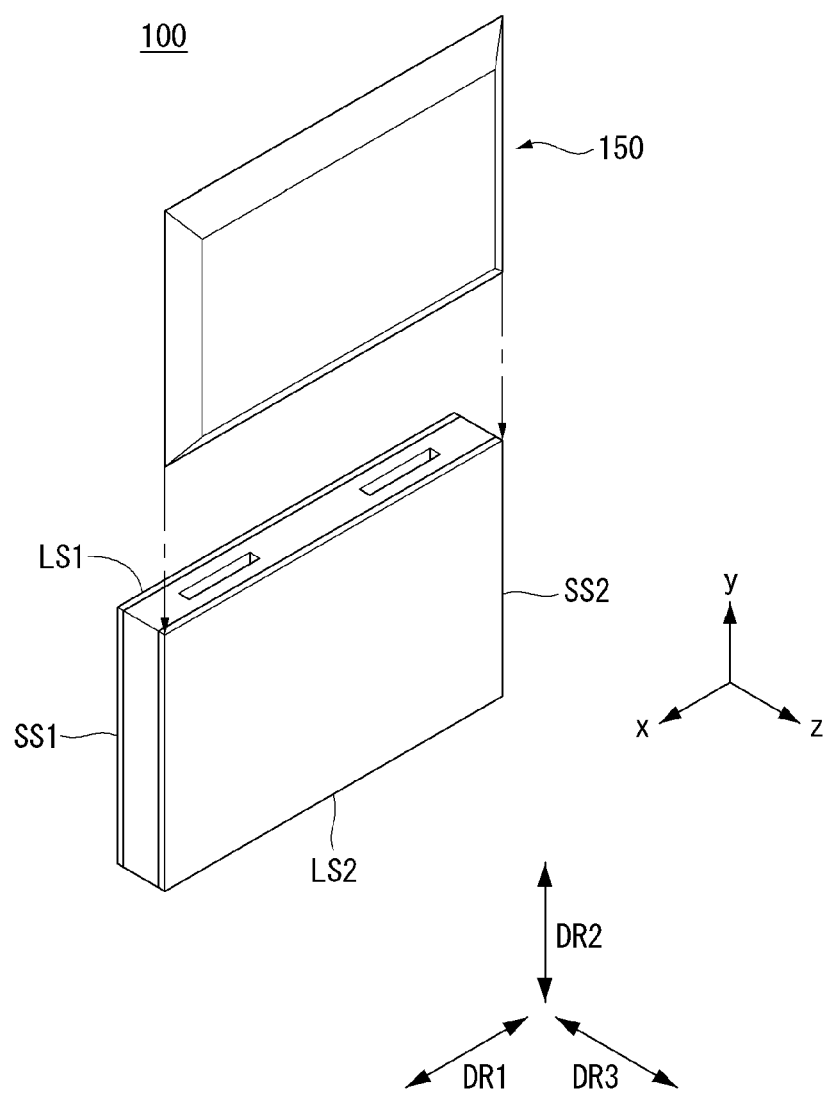

Referring to FIGS. 1 and 2, the back cover 150 may be coupled to the display panel 110. In order for the back cover 150 to be coupled with the display panel 110, the back cover 150 and/or other structures adjacent thereto may include protrusions, sliding portions, engaging portions, and the like.

Figure 3:
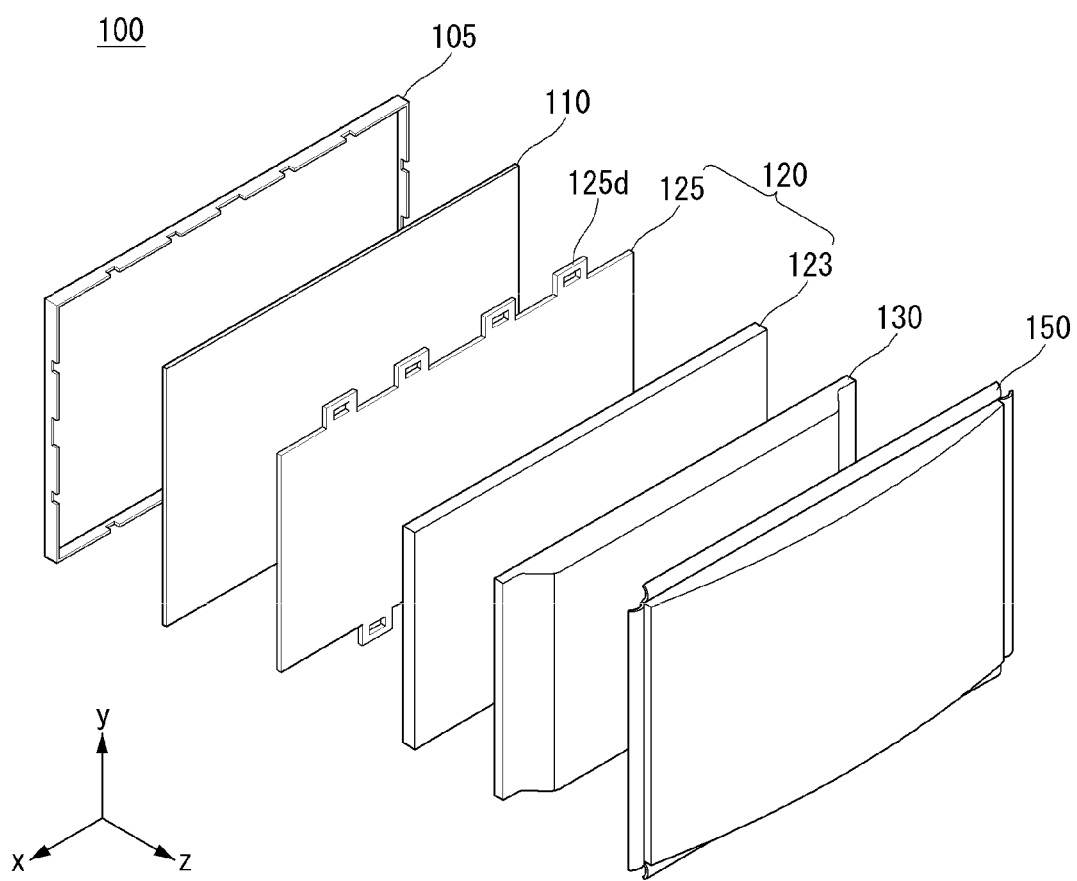
Figure 4:
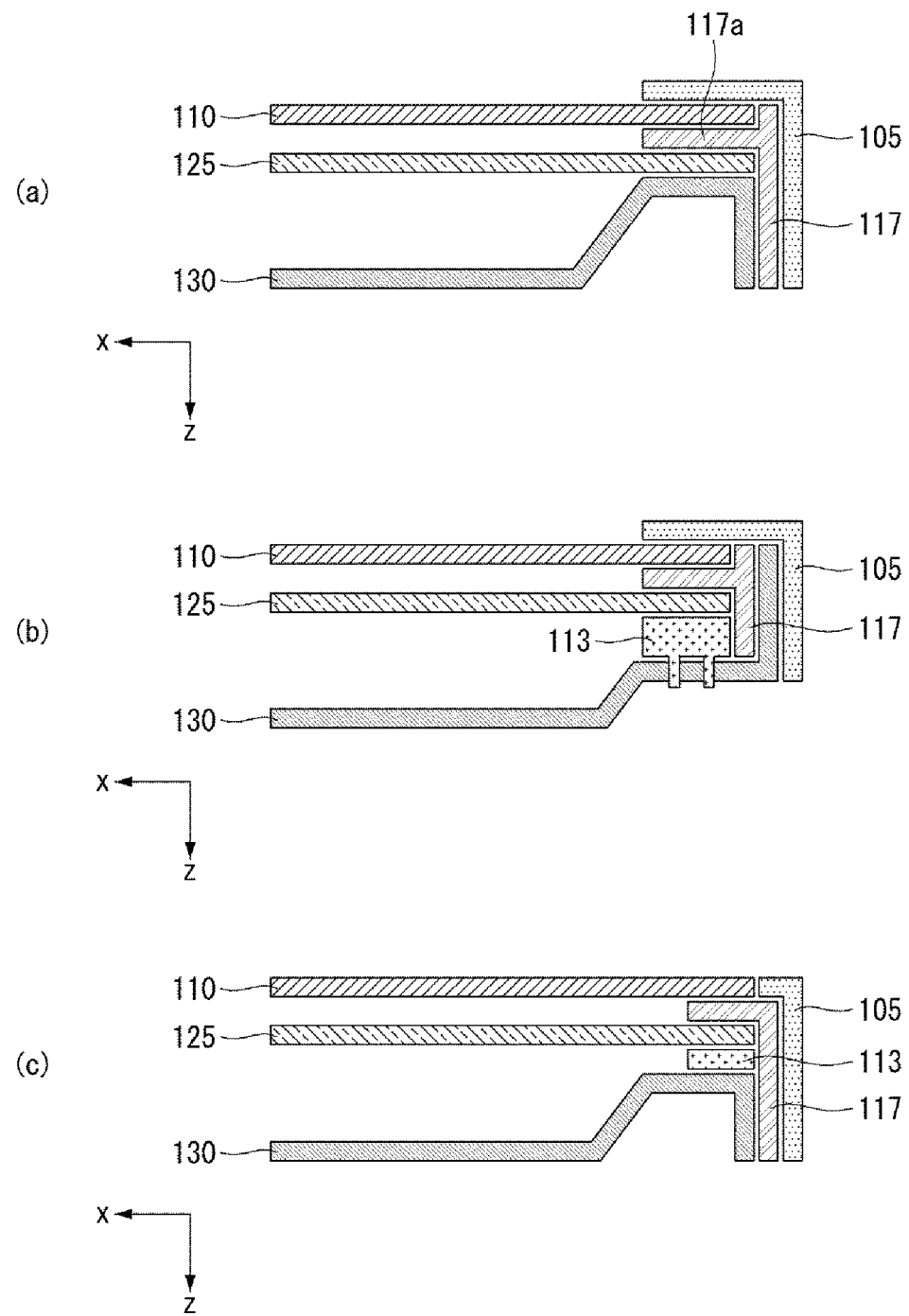

Referring to FIG. 3, the front cover 105 may cover at least a part of the front surface and the lateral surface of the display panel 110. The front cover 105 can be divided into a front side cover positioned on the front side of the display panel 110 and a lateral side cover positioned on the lateral side of the display panel 110. The front side cover and the lateral side cover may be separately formed. One of the front side cover or the lateral side cover may be omitted.

The display panel 110 can be positioned at a front portion of the display device 100 and can display an image. The display panel 110 can display an image by outputting RGB (red, green or blue) for each pixel by a plurality of pixels on timing. The display panel 110 may be divided into an active area on which an image is displayed and a de-active area on which an image is not displayed. The display panel 110 may include a front substrate and a rear substrate facing the front substrate. A liquid crystal layer may be positioned between the front and rear substrates.

The front substrate may include a plurality of pixels made up of red (R), green (G), and blue (B) sub-pixels. The front substrate can emit light corresponding to the color of red, green, or blue according to a control signal.

The back substrate may include switching elements. The rear substrate can switch the pixel electrodes. For example, the pixel electrode can change the molecular arrangement of the liquid crystal layer according to a control signal applied from the outside. The liquid crystal layer may include liquid crystal molecules. The liquid crystal molecules can change the arrangement in accordance with the voltage difference generated between the pixel electrode and the common electrode. The liquid crystal layer may transmit or block the light provided from the backlight unit 120 to the front substrate.

The backlight unit 120 may be positioned at the rear of the display panel 110. The backlight unit 120 may include light sources. The backlight unit 120 may be coupled to the frame 130 in front of the frame 130.

The backlight unit 120 may be driven in a whole driving manner or a partial driving manner such as local dimming, impulsive, or the like. The backlight unit 120 may include an optical sheet 125 and an optical layer 123.

The optical sheet 125 may transmit light of the light source to the display panel 110 uniformly. The optical sheet 125 may be composed of layers. For example, the optical sheet 125 may include a prism sheet, a diffusion sheet, and the like.

The optical sheet 125 may have a coupling portion 125d. The coupling portion 125d may be coupled to the front cover 105, the frame 130, and/or the back cover 150. Alternatively, the coupling portion 125d may be fastened to a structure which is formed or coupled on the front cover 105, the frame 130, and/or the back cover 150.

The frame 130 may support components of the display device 100. For example, a configuration such as the backlight unit 120 or the like may be coupled to the frame 130. The frame 130 may be made of a metal such as an aluminum alloy.

The back cover 150 may be located at the rear portion of the display device 100. The back cover 150 may be coupled to the frame 130 and/or the front cover 105. For example, the back cover 150 may be an injection-molded material of a resin.

Referring to FIG. 4(a), the optical sheet 125 may be positioned in front of the frame 130. The optical sheet 125 can be engaged with the frame 130 at an edge of the frame 130. The optical sheet 125 can be directly seated on the edge of the frame 130. The optical sheet 125 can be supported by the frame 130. The edge of the optical sheet 125 can be covered by the first guide panel 117. For example, the optical sheet 125 may be positioned between the edge of the frame 130 and the flange 117a of the first guide panel 117.

In front of the optical sheet 125, the display panel 110 can be positioned. Edges of the display panel 110 may be supported by the first guide panel 117. An edge area of the front surface of the display panel 110 may be covered by the front cover 105. For example, a part of the display panel 110 can be positioned between the first guide panel 117 and the front cover 105.

Referring to FIG. 4(b), the optical sheet 125 can be coupled to the second guide panel 113. That is, the second guide panel 113 may be coupled to the frame 130, and the optical sheet 125 may be coupled to the second guide panel 113. The second guide panel 113 may be made of a different material from the frame 130. The frame 130 may be configured to enclose the first and second guide panels 117 and 113 or to contain first and second guide panels 117 and 113. The first or second guide panel 117 or 113 may be referred to as a holder or a support member.

Referring to FIG. 4(c), the front cover 105 may not cover the front surface of the display panel 110. The front cover 105 may be positioned on the lateral side of the display panel 110.

Figure 5A:
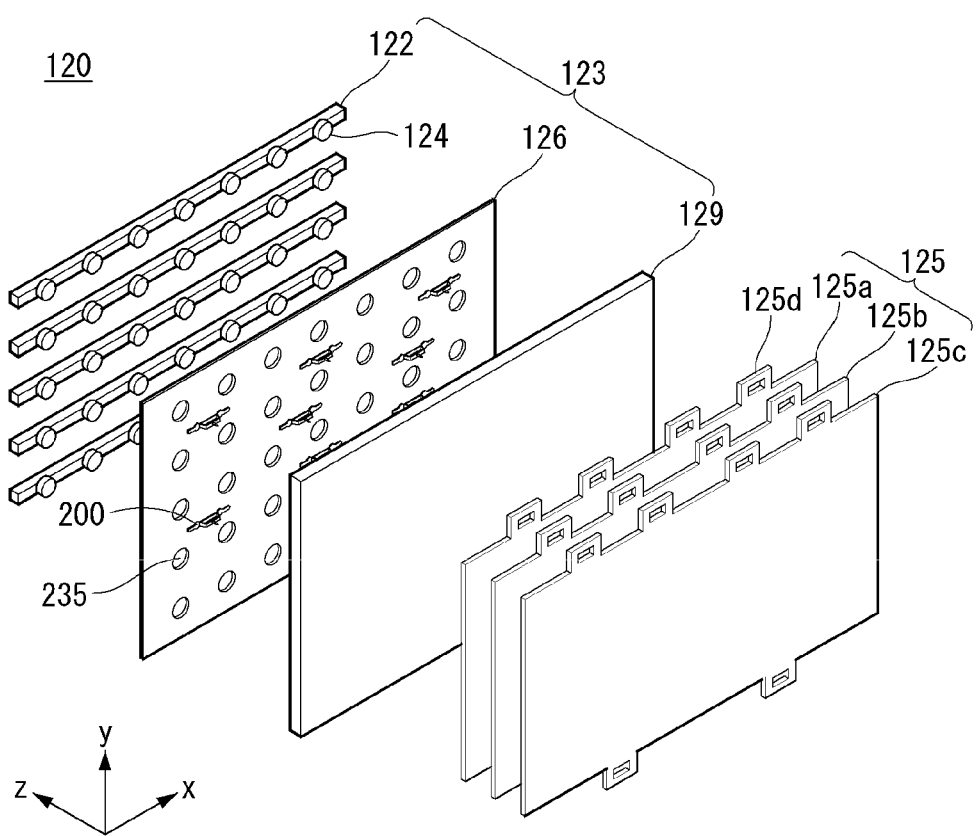

Referring to FIG. 5A, a backlight unit 120 may include: an optical layer 123 having a substrate 122, at least one optical assembly 124, a reflective sheet 126, and a diffusion plate 129; and an optical sheet 125 positioned on the front side of the optical layer 123.

The substrate 122 may have a plurality of straps extending in a first direction and spaced apart from each other by a certain distance in a second direction normal to the first direction.

At least one optical assembly 124 may be mounted on the substrate 122. An electrode pattern for connecting the adapter to the optical assembly 124 may be formed on the substrate 122. For example, a carbon nanotube electrode pattern for connecting the optical assembly 124 to the adapter may be formed on the substrate 122.

The substrate 122 may be composed of at least one of polyethylene terephthalate (PET), glass, polycarbonate (PC), and silicon. The substrate 122 may be a printed circuit board (PCB) on which at least one optical assembly 124 is mounted.

The optical assemblies 124 may be disposed on the substrate 122 with certain spacing in the first direction. The diameter of the optical assembly 124 may be greater than the width of the substrate 122. The diameter of the optical assembly 124 may be greater than the length of the substrate 122 in the second direction.

The optical assembly 124 may be a light emitting diode (LED) package. The optical assembly 124 may include at least one light emitting diode chip.

The optical assembly 124 may be comprised of a white LED or a colored LED (which emits at least one of the colors, such as red, blue, green, and the like). The colored LED may include at least one of a red LED, a blue LED, and a green LED.

A reflective sheet 126 may be positioned at the front of the substrate 122. The reflective sheet 126 may have a plurality of through-holes 235. The optical assemblies 124 may be positioned in the through-holes 235.

The reflective sheet 126 may reflect the light emitted from the optical assembly 124 to the front side. Further, the reflective sheet 126 can reflect the light reflected from the diffusion plate 129 again.

The reflective sheet 126 may include at least one of a metal and a metal oxide which are reflective materials. For example, the reflective sheet 126 may include a metal and/or a metal oxide having a high reflectance such as aluminum (Al), silver (Ag), gold (Au), and titanium dioxide (TiO2).

Resins can be deposited on the optical assembly 124 and/or the reflective sheet 126. The resin may serve to diffuse the light emitted from the optical assembly 124. The diffusion plate 129 can diffuse the light emitted from the optical assembly 124 forward.

The optical sheet 125 can be positioned in front of the diffusion plate 129. The rear surface of the optical sheet 125 may be in close contact with the diffusion plate 129. The front surface of the optical sheet 125 may be in close contact with the rear surface of the display panel 110 (see FIG. 1).

The optical sheet 125 may include at least one sheet. In detail, the optical sheet 125 may include one or more prism sheets and/or one or more diffusion sheets. The plurality of sheets included in the optical sheet 125 may be in an adhered and/or adhered state.

The optical sheet 125 may be composed of a plurality of sheets having different functions. For example, the optical sheet 125 may include first to third optical sheets 125a to 125c. For example, the first optical sheet 125a may be a diffusion sheet, and the second and third optical sheets 125b and 125c may be a prism sheet. The number and/or position of the diffusion sheet and the prism sheet can be changed.

The diffusion sheet can prevent the light from the diffusion plate 129 from being partially concentrated, thereby can make the distribution of light more uniform. The prism sheet can collect light from the diffusion sheet to provide light to the display panel 110.

The coupling portion 125d may be formed on at least one of the sides or edges of the optical sheet 125. The coupling portion 125d may be formed on at least one of the first to third optical sheets 125a to 125c.

The coupling portion 125d may be formed at the long side of the optical sheet 125. The first long side of the optical sheet 125 may be opposite to the second long side of the optical sheet 125. The coupling portion 125d formed on the first long side and the coupling portion 125d formed on the second long side may be asymmetric. For example, the position and/or number of the coupling portion 125d at the first long side may different from the position and/or number of the coupling portion 125d at the second long side.

Figure 5B:
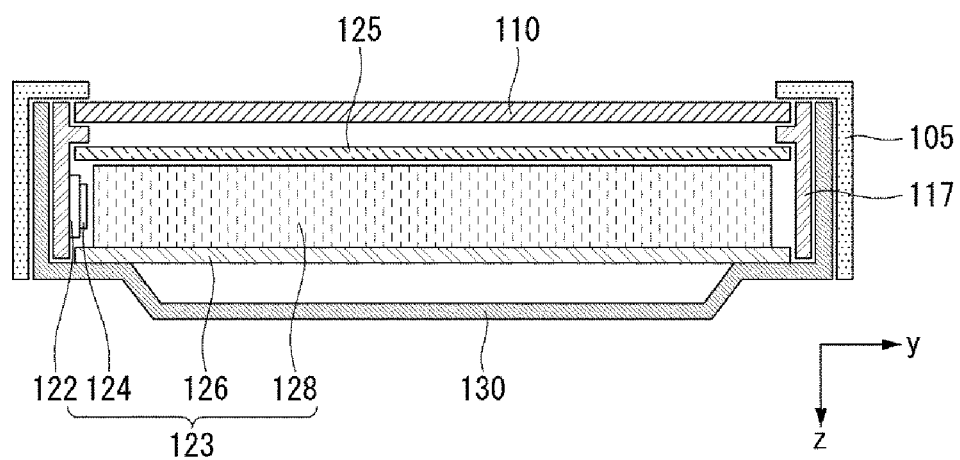

Referring to FIG. 5B, the optical layer 123 may include a substrate 122, a reflective sheet 126, an optical assembly 124, and a light guide panel 128. The optical layer 123 may not include some of these elements.

The optical layer 123 may be located in front of the frame 130. The optical layer 123 may be positioned between the frame 130 and the display panel 110. The optical layer 123 may be supported by the frame 130.

The substrate 122 may be located inside the frame 130. The substrate 122 may be coupled to the first guide panel 117. The substrate 122 may be directly coupled to the first guide panel 117. For example, the substrate 122 may be coupled to at least one of the first guide panel 117, the frame 130, and the front cover 105. The front cover 105 may be referred to as a top case 105.

The substrate 124 may be positioned adjacent to the lateral side of the reflective sheet 126 and/or the light guide plate 128. The front surface of the substrate 124 can face the optical layer 123. The substrate 124 and the reflective sheet 126 and/or the light guide plate 128 may be spaced apart from each other.

Figure 6:
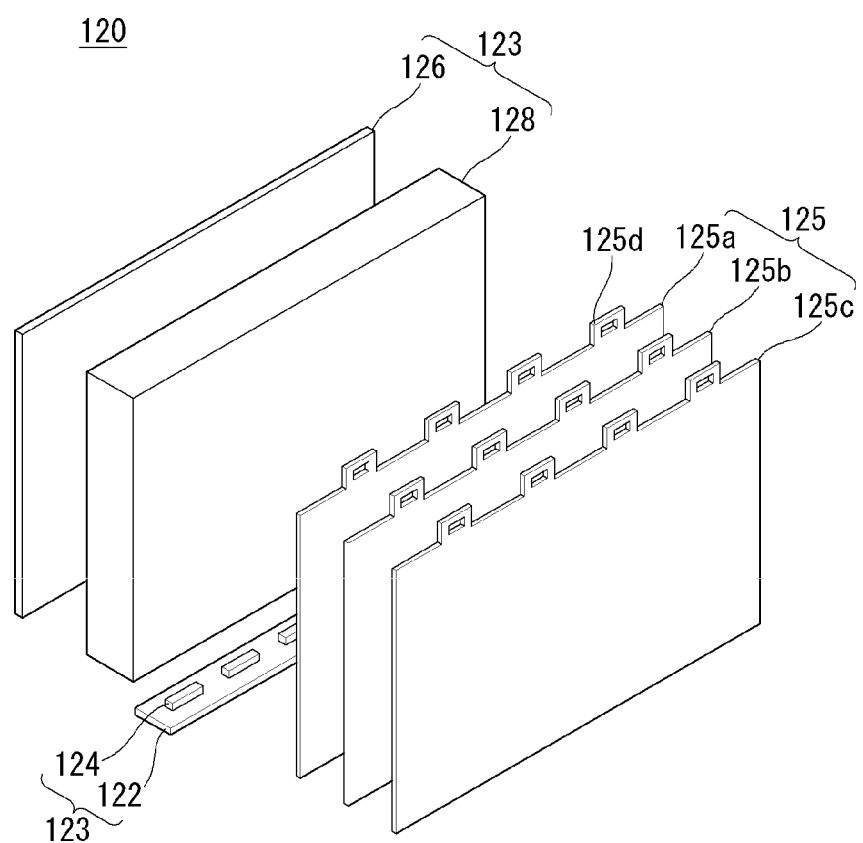
Figure 7:
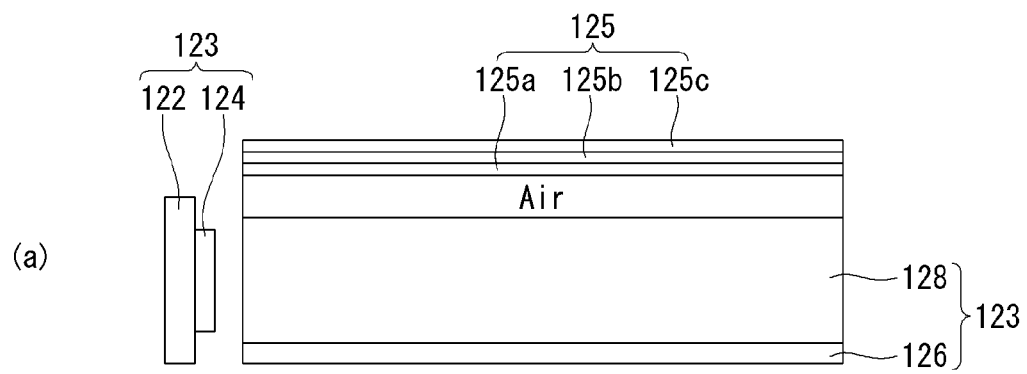
Figure 7:
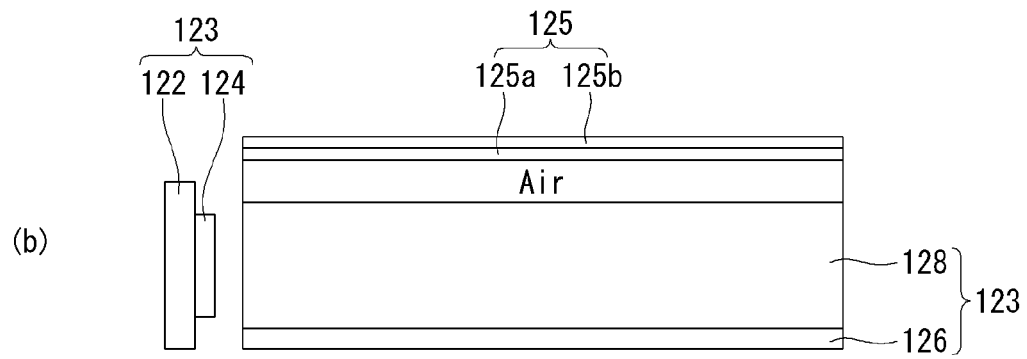

Referring to FIGS. 6 and 7, the substrate 122 may be located on at least one side of the other configuration of the optical layer 123. The optical assembly 124 or the optical assemblies 124 may be mounted on the substrate 122. An electrode pattern for connecting the adapter to the optical assembly 124 may be formed on the substrate 122. For example, a carbon nano tube electrode pattern for connecting the optical assembly 124 to the adapter may be formed on the substrate 122. For example, the substrate 122 may be a printed circuit board (PCB).

Optical assemblies 124 may be disposed on the substrate 122. The optical assembly 124 may be smaller than the thickness of the light guide plate 128. Therefore, most of the light provided from the optical assembly 124 can be transmitted to the light guide plate 128.

The optical assembly 124 may include a light emitting diode (LED) chip. The optical assembly 124 may be a light emitting diode package. The light emitting diode package may include a light emitting diode chip.

The optical assembly 124 may comprise a colored LED (emitting at least one of the colors such as red, blue, green, etc.) or a white LED.

The light source included in the optical assembly 124 may be a COB (Chip On Board) type. The COB type may be a form in which an LED chip (a light source) is directly coupled to the substrate 122. Therefore, the process can be simplified. In addition, the electric resistance can be lowered, thereby reducing electric energy lost by heat. The power efficiency of the optical assembly 124 can be increased. The optical assembly 124 in COB type can provide a brighter light. The optical assembly in COB type can be made thinner and lighter than light source in conventional type.

The light guide plate 128 can spread the light incident from the optical assembly 124 widely. The reflective sheet 126 may be positioned behind the light guide plate 128. The reflective sheet 126 may reflect light provided from the optical assembly 124. The reflective sheet 126 can reflect the light introduced from the light guide plate 128 to the front side of the light guide plate 128.

The reflective sheet 126 may include at least one of a metal and a metal oxide which are reflective materials. For example, the reflective sheet 126 may include a metal and/or a metal oxide having a high reflectance such as aluminum (Al), silver (Ag), gold (Au), and titanium dioxide (TiO2).

The reflective sheet 126 may be formed by depositing and/or coating a metal or metal oxide. The reflective sheet 126 may be printed with an ink containing a metal material. The reflective sheet 126 may have a vapor deposition layer formed by using a vacuum deposition method such as a thermal evaporation method, an evaporation method, or a sputtering method. A coating layer and/or a printing layer by using a printing method, a gravure coating method, or a silk screen method, may be formed on the reflective sheet 126.

A diffusion plate (not shown) may be further provided at the front side of the light guide plate 128. The diffusion plate can diffuse the light emitted from the light guide plate 128 forward.

An air gap may be located between the light guide plate 128 and the optical sheet 125. The air gap can disperse the light emitted from the optical assembly 124. A resin can be deposited on the optical assembly 124 and/or the reflective sheet 126. The resin can diffuse the light provided from the optical assembly 124.

The optical sheet 125 may be positioned in front of the light guide plate 128. The rear surface of the optical sheet 125 may face the light guide plate 128. The front surface of the optical sheet 125 may face the rear surface of the display panel 110.

The optical sheet 125 may include at least one sheet. The optical sheet 125 may include one or more prism sheets and/or one or more diffusion sheets. The plurality of sheets included in the optical sheet 125 may be in an adhered state and/or in close contact with each other.

For example, the optical sheet 125 may include first to third optical sheets 125a to 125c. The first optical sheet 125a may be a diffusion sheet, and the second and third optical sheets 125b and 125c may be a prism sheet. The number and/or position of the diffusion sheet and the prism sheet can be changed.

The diffusion sheet can prevent the light from the light guide panel 128 from being partially concentrated, thereby can make the distribution of light more uniform. The prism sheet can collect light from the diffusion sheet to provide light to the display panel 110.

Referring to FIGS. 3 and 6, the coupling portion 125d may be formed at an edge of the optical sheet 125. The coupling portion 125d may be formed on at least one of the first to third optical sheets 125a to 125c.

The coupling portion 125d may be formed at the long side of the optical sheet 125. The first long side of the optical sheet 125 may be opposite to the second long side of the optical sheet 125. The coupling portion 125d formed on the first long side may be asymmetric with the coupling portion 125d formed on the second long side. For example, the position and/or number of the coupling portion 125d at the first long side may different from the position and/or number of the coupling portion 125d at the second long side.

Figure 8:
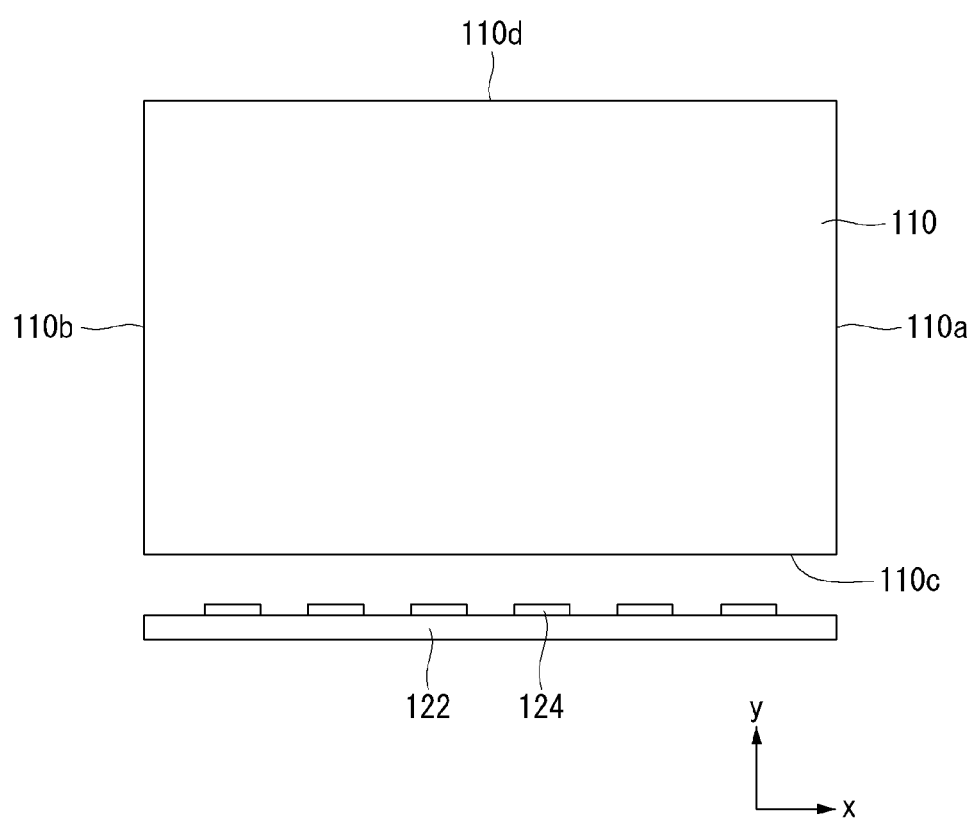
Figure 9:
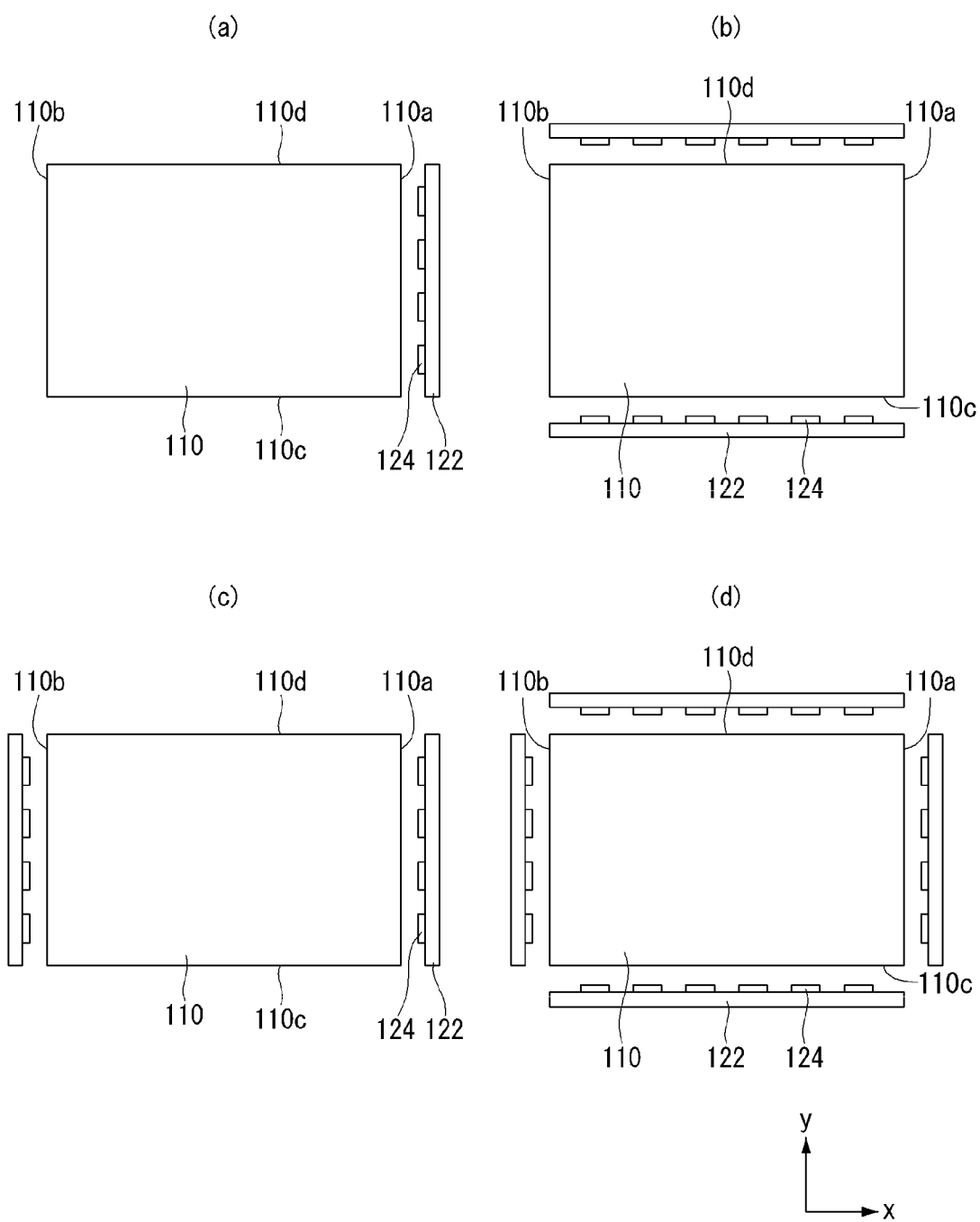

Referring to FIGS. 8 and 9, the substrate 122 and the optical assembly 124 may be positioned adjacent to the lower side 110c of the display panel 110.

Referring to FIG. 8, the optical assembly 124 may provide light from the lower side 110c to the upper side 110d of the display panel 110. The light provided in the optical assembly 124 may diffuse from the lower side 110c of the display panel 110 to the upper side 110d. The optical assembly 124 may provide light to the entire display panel 110.

Referring to FIG. 9(a), the optical assembly 124 may be located on the right side 110a of the display panel 110. In another example, the optical assembly 124 may be located on the left side 110b of the display panel 110.

Referring to FIG. 9(b), the optical assembly 124 may be located on the lower side 110c and the upper side 110d of the display panel 110. Referring to FIG. 9(c), the optical assembly 124 may be located on the right side 110a and the left side 110b of the display panel 110.

Referring to FIG. 9 (d), the optical assembly 124 may be positioned on four sides of the display panel 110. In case that the optical assembly 124 is located on four sides of the display panel 110, the light provided in the optical assembly 124 may be more easily diffused.

Figure 10:
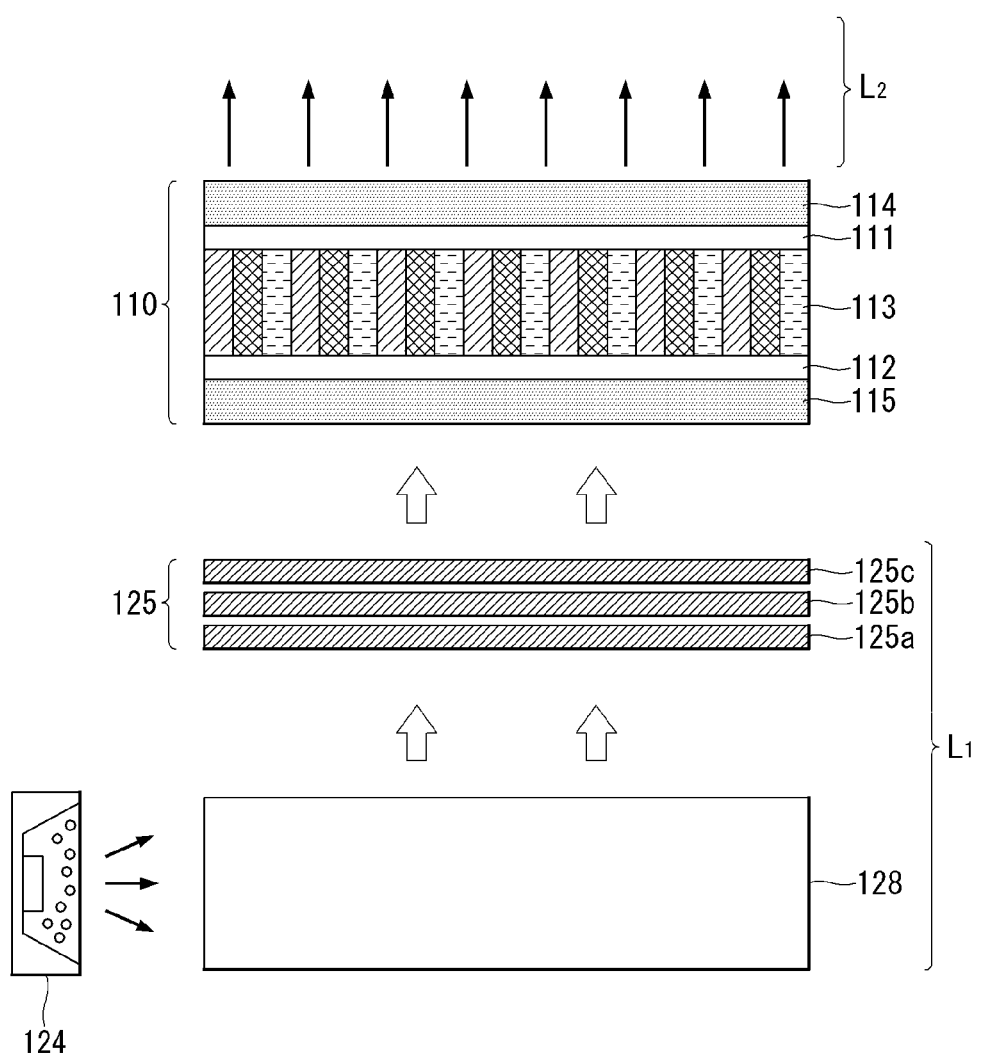
FIGS. 10 to 12 are views showing examples of light and its spectrum provided from a display device according to an embodiment of the present invention.
Figure 11:
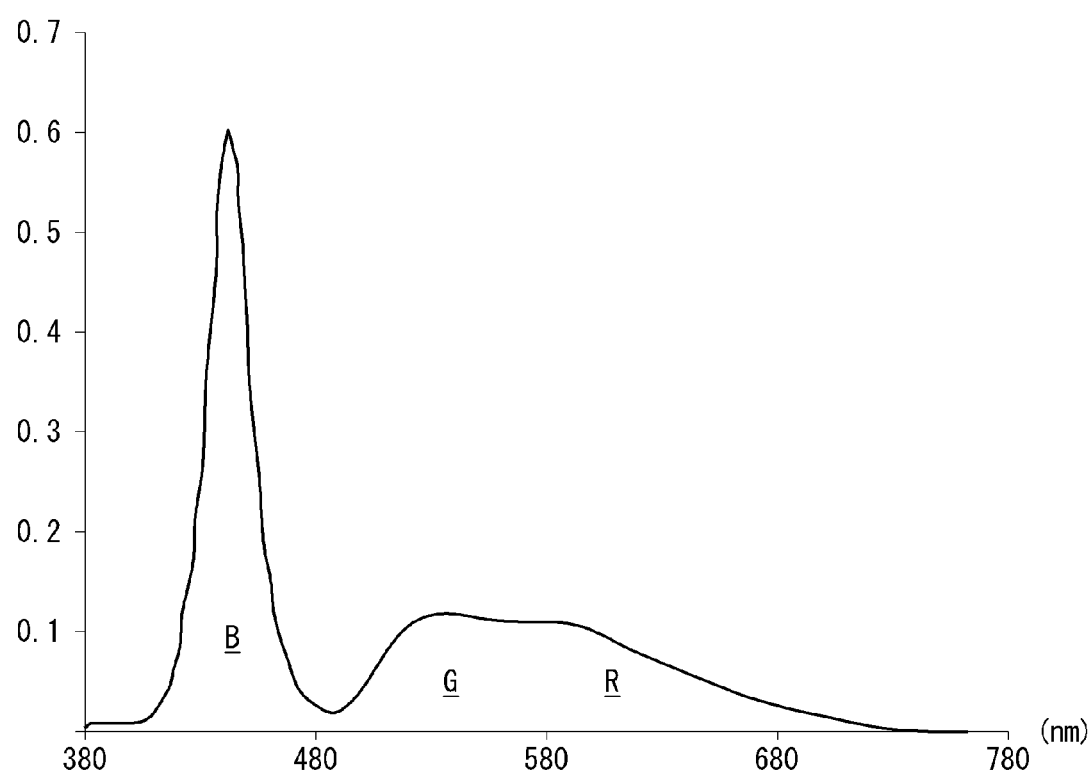
Figure 12:
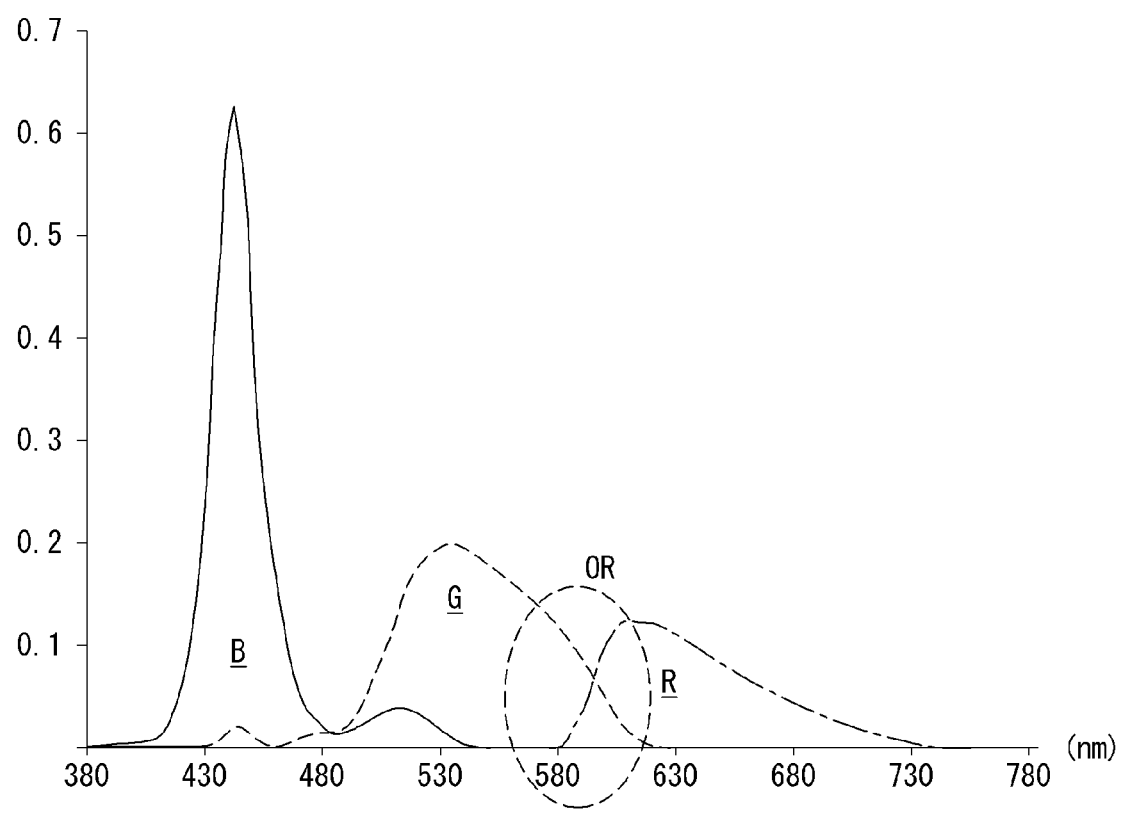

FIGS. 10 to 12 are diagrams showing examples of light and its spectrum provided in a display device related to the present invention.

Referring to FIG. 10, the optical assembly 124 may provide light to the light guide plate 128. Light reflected and/or refracted at the light guide plate 128 can be directed to the optical sheet 125. The light scattered and/or condensed at the optical sheet 125 may be provided to the display panel 110. The display panel 110 can display an image using this light.

Light incident on the display panel 110 by the optical assembly 124 may be referred to as L1 and light passed through the display panel 110 may be referred to as L2. L1 can have a spectrum of light different from L2.

FIG. 11 may show an example of the spectrum of L1. Referring to FIG. 11, the x-axis may represent wavelength (nm) of light and the y-axis may represent intensity of light. B may be the intensity or distribution of the blue-based light. G may be the intensity or distribution of the green-based light. R may be the intensity or distribution of the red-based light.

The optical assembly 124 (see FIG. 10) may include an LED as a light source. The LED can emit white light. At this time, the LED emitting white light may be a blue LED packaged with a yellow or red fluorescent substance. The light source having such a configuration can provide light (L1) of the wavelength and/or intensity shown in FIG. 11.

FIG. 12 shows an example of the spectrum of L2. Referring to FIG. 12, an example of a spectrum of light (for example, light that implements an image) provided from the display panel 110 (see FIG. 10) may be shown. Referring to FIG. 12, the color purity of the blue-based light B may be relatively high. The color purity of the green-based light G or the red-based light R may be relatively low because the green-based light G and the red-based light R are overlapped with each other (see OR in the FIG. 12). The purity of the color is not high, and then the color expressiveness can be poor. The purity of the color is not high, and then it can be difficult to achieve good image quality.

FIGS. 13 to 18 are views illustrating examples of a light absorber or a light absorbing layer included in a display device according to an embodiment of the present invention.

Figure 13:
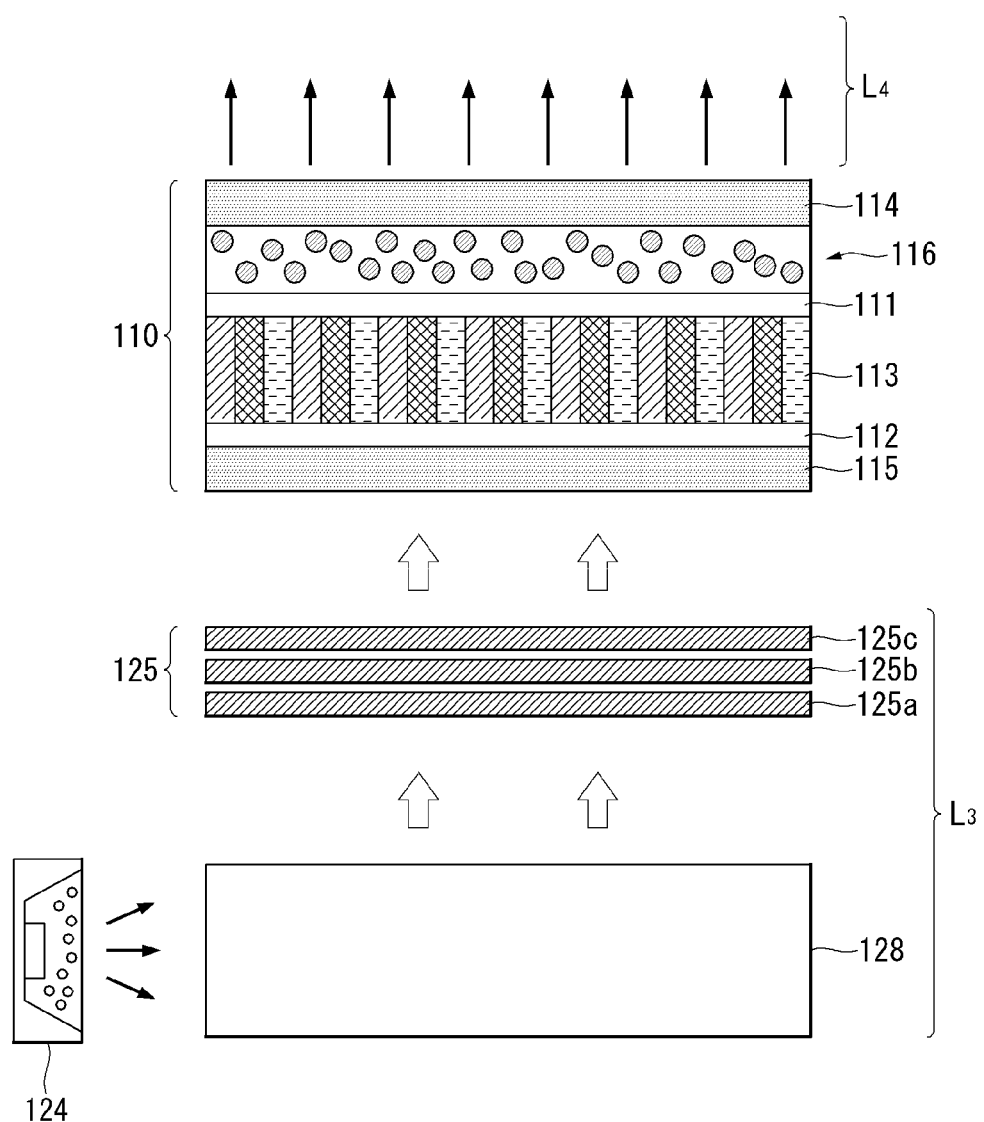
FIGS. 13 to 18 are views showing examples of a light absorbing layer or a light absorber included in a display device according to an embodiment of the present invention.

Referring to FIG. 13, the optical assembly 124 may provide light to the light guide plate 128. Light reflected and/or refracted at the light guide plate 128 can be directed to the optical sheet 125. The light scattered and/or condensed at the optical sheet 125 may be provided to the display panel 110. The display panel 110 can display an image using the provided light.

Light incident on the display panel 110 from the optical assembly 124 may be referred to as L3 and light passed through the display panel 110 may be referred to as L4. L3 can have a spectrum of light different from L4.

The light absorber 116 may be positioned at a front portion or a rear portion of the display panel 110. The display panel 110 may include a front substrate 111, a rear substrate 112, a color filter 113, and polarization films 114 and 115. The color filter 113 may be disposed between the front substrate 111 and the rear substrate 112. The first polarization film 114 may be positioned on the front surface of the front substrate 111. The second polarization film 115 may be positioned on the rear surface of the rear substrate 112. The liquid crystal layer or the TFT may be positioned between the front substrate 111 and the rear substrate 112.

The light absorber 116 may be positioned or formed between the front substrate 111 and the first polarization film 114. The light absorber 116 may be a film. The light absorber 116 may be disposed on or bonded to the front surface of the front substrate 111. The light absorber 116 may be a layer formed on the front surface of the front substrate 111. The light absorber 116 may be applied or deposited on the front surface of the front substrate 111 in a liquid state and cured.

For example, the light absorber 116 may comprise light absorbing particles and an encapsulant. The light absorbing particle will be described later. The encapsulant may be an adhesive. After the light absorbing particles are mixed with the encapsulant, the light absorber 116 can be formed by applying them onto the front substrate 111. The light absorber 116 can be referred to as a light absorbing layer 116.

Figure 14:
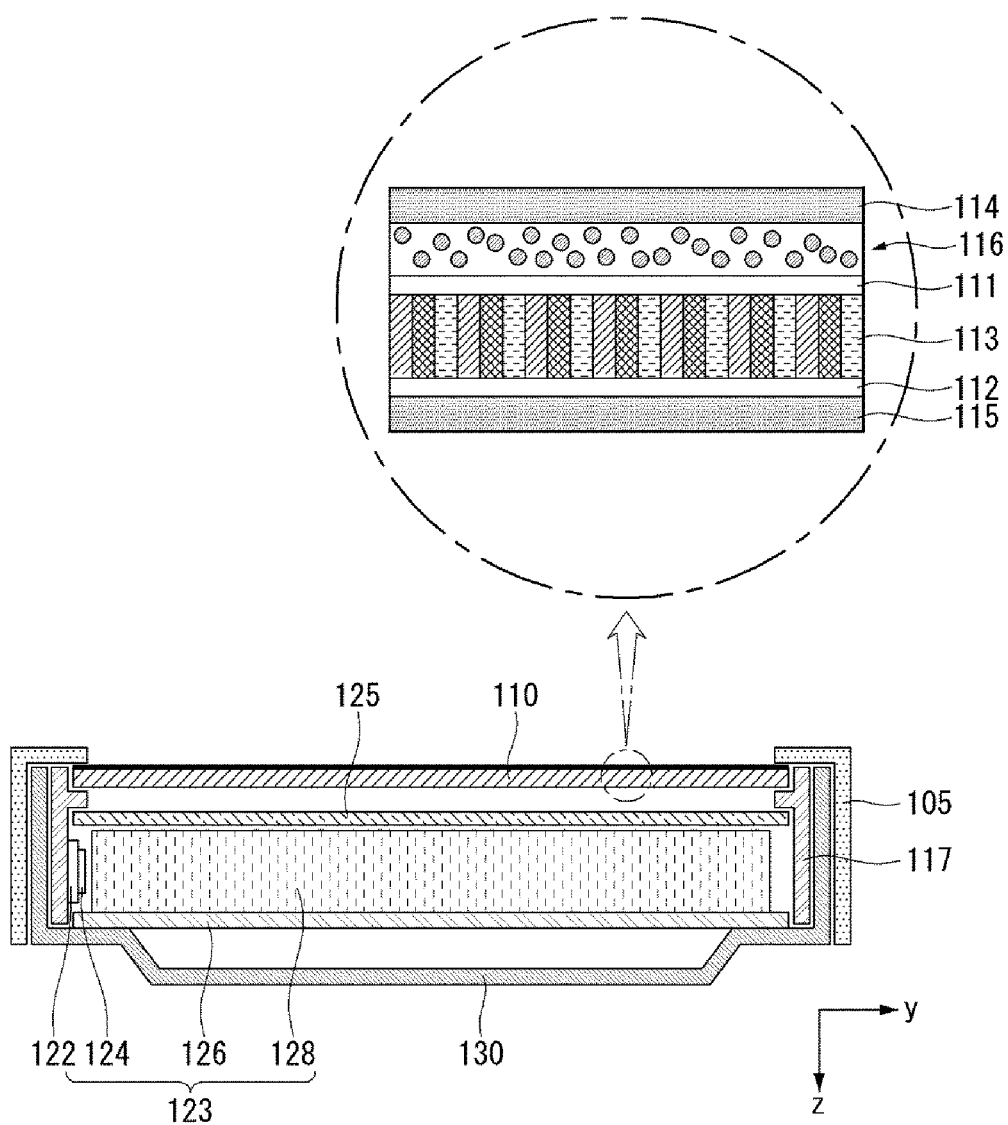

Referring to FIG. 14, the light absorbing layer 116 may be positioned at a front portion of the display panel 110. The light absorbing layer 116 may be formed on the front surface of the front substrate 111, or may be deposited or adhered thereto.

Figure 15:
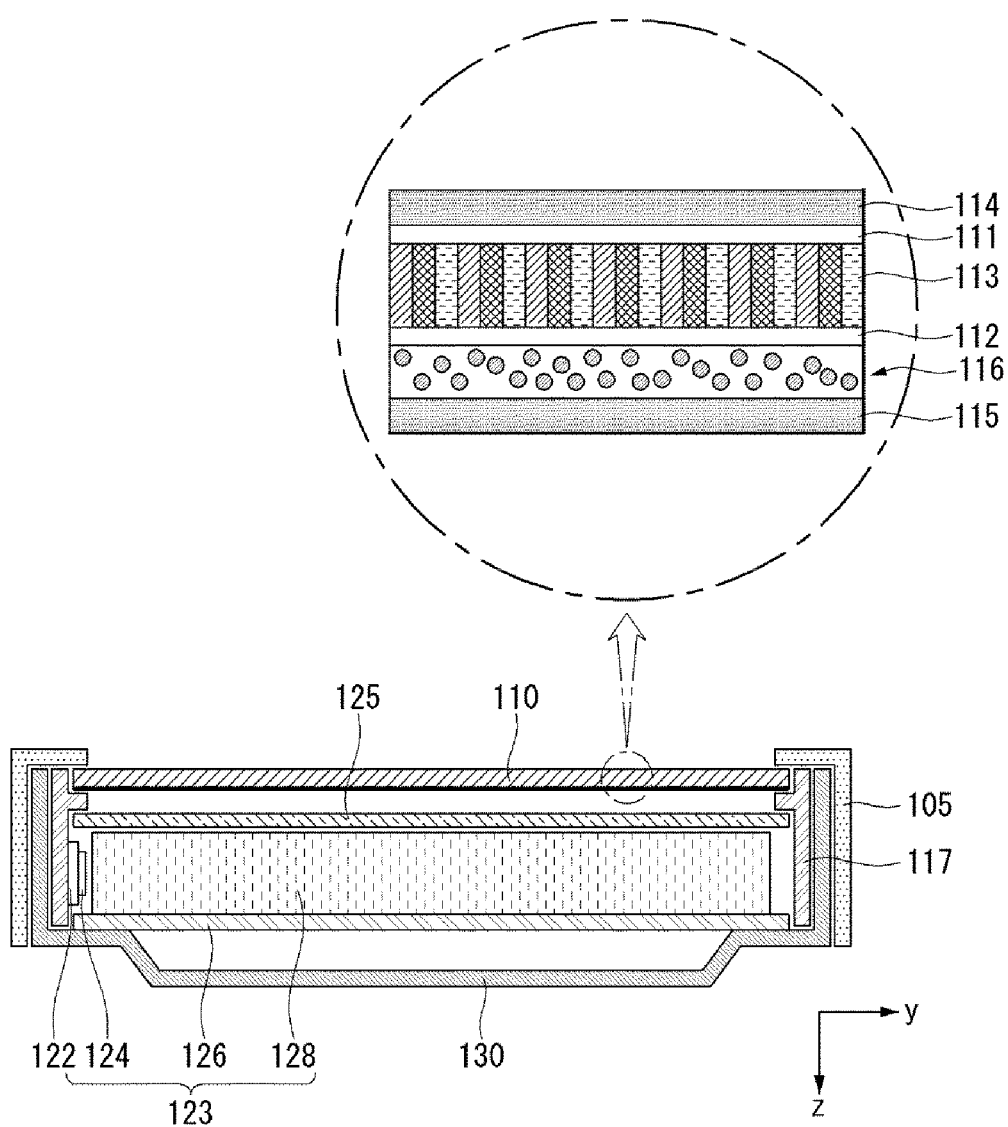

Referring to FIG. 15, the light absorbing layer 116 may be located at the rear portion of the display panel 110. The light absorbing layer 116 may be located on the back surface of the back substrate 112, or may be formed or deposited or adhered thereto.

Figure 16:
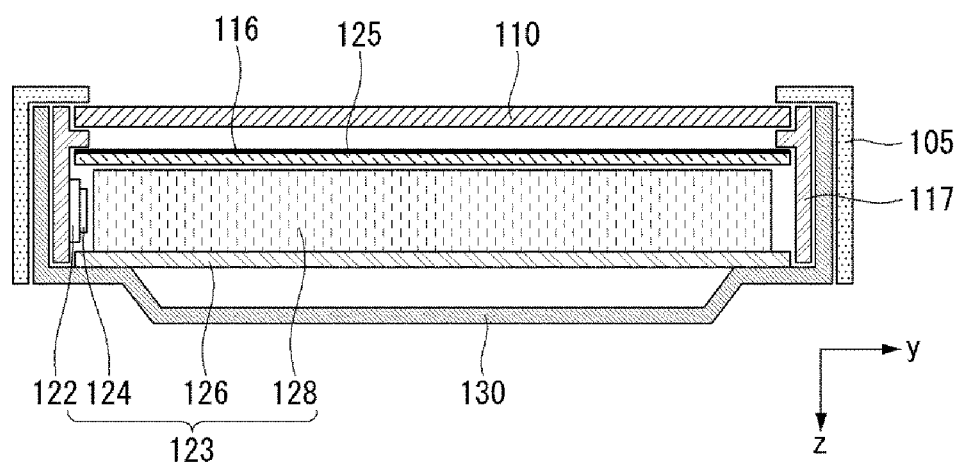

Referring to FIG. 16, the light absorbing layer 116 may be formed in front of the optical sheet 125, or may be formed on the front surface of the optical sheet 125, or may be adhered or deposited.

Figure 17:
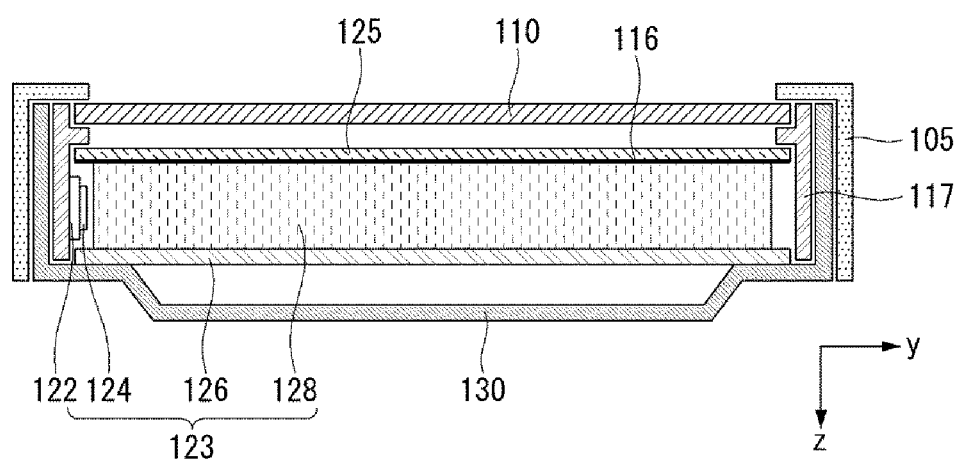

Referring to FIG. 17, the light absorbing layer 116 may be located behind the optical sheet 125, or may be formed on the back surface of the optical sheet 125, or may be adhered or deposited. The light absorbing layer 116 may be positioned between the optical sheet 125 and the light guide plate 128. The light absorbing layer 116 may be formed on, adhered to, or deposited on the front side of the light guide plate 128.

Figure 18:
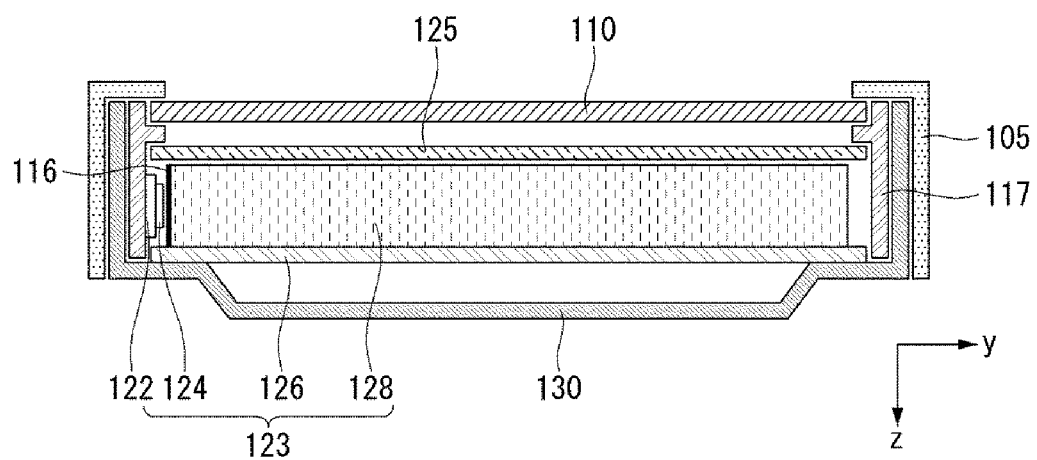

Referring to FIG. 18, the light absorbing layer 116 may be positioned between the light guide plate 128 and the optical assembly 124. The light absorbing layer 116 may be formed, adhered or deposited on the lateral surface of the light guide plate 128. The light absorbing layer 116 may be located on the lateral side of the light guide plate 128 facing the optical assembly 124. The light absorbing layer 116 may face the optical assembly 124.

The light absorbing layer 116 may be on the path of the light provided from the optical assembly 124 and directed toward the display panel 110. At least a portion of the light provided from the optical assembly 124 and directed toward the display panel 110 may pass through the light absorbing layer 116.

Figure 19:
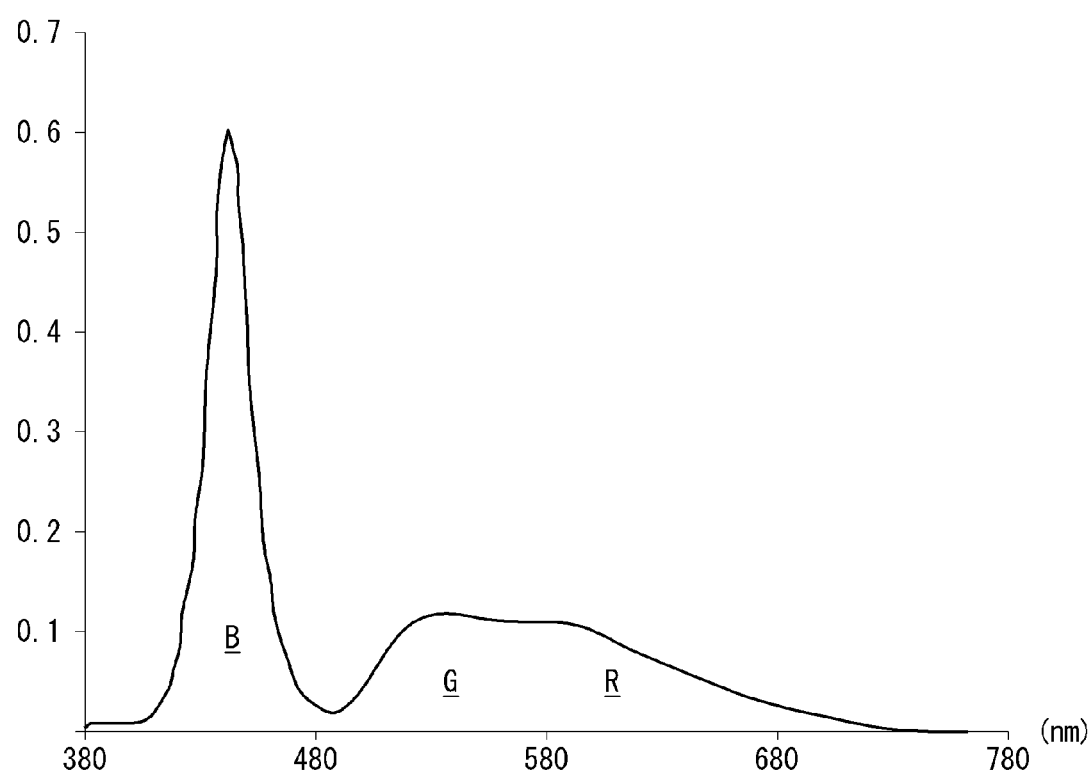
FIG. 19 is a view illustrating an example of light spectrum provided by a light source or a backlight unit according to an embodiment of the present invention.

FIG. 19 is a diagram illustrating an example of light spectrum provided by a light source or a backlight unit according to an embodiment of the present invention.

FIG. 19 is an example of the spectrum of L3. Referring to FIG. 19, the x-axis may represent wavelength (nm) of light and the y-axis may represent intensity of light. The x-axis may stand for a horizontal axis and the y-axis may stand for a vertical axis. B may be the intensity or distribution of the blue-based light. G may be the intensity or distribution of the green-based light. R may be the intensity or distribution of the red-based light.

The optical assembly 124 (see FIG. 13) may include an LED as a light source. The LED can emit white light. The LED emitting white light may include a blue LED packaged with a yellow or red fluorescent substance. The light source having such a configuration can provide the light L3 of the wavelength and/or intensity shown in FIG. 19.

Figure 20:
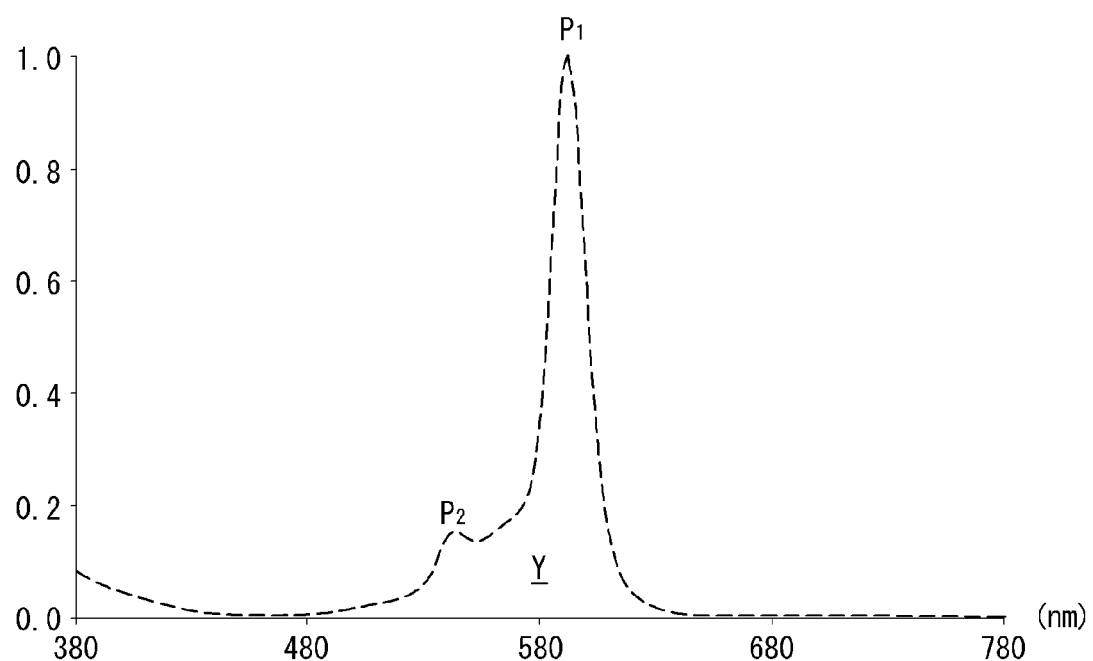
FIG. 20 is a view showing an example of an absorption spectrum of a light absorbing layer or a light absorber according to an embodiment of the present invention.

FIG. 20 is a diagram showing an example of a spectrum of light absorbed by a light absorbing layer or a light absorber according to an embodiment of the present invention.

The light absorber 116 (see FIG. 13) may comprise a light absorbing particle or a light absorbing material. For example, the light absorbing particle or the light absorbing material may be Tetra Aza Porphyrin. The light absorbing particle or the light absorbing material may be represented by the following first chemical formula.

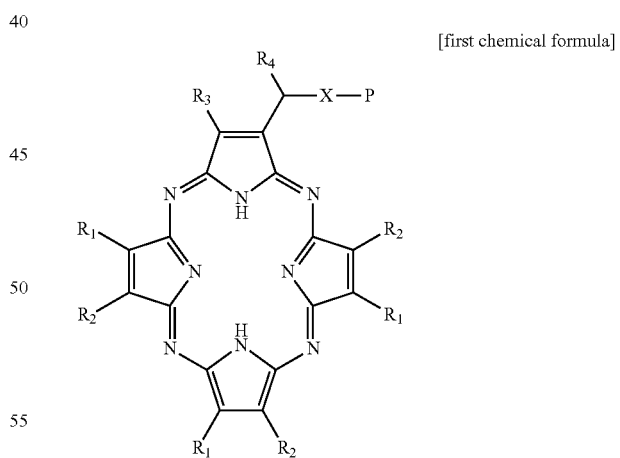

[first chemical formula]

Referring to FIG. 20, the light absorber 116 (see FIG. 13) can absorb light of a certain wavelength band (e.g. yellow-based light). For example, the light absorber 116 can absorb light having a wavelength between 540 nm and 600 nm. The first peak P1 may be, for example, a wavelength region of 592 nm. The second peak P2 may be, for example, a wavelength region of 543 nm. The energy of light absorbed by the light absorber 116 can be consumed or exhausted by rotation or vibration of electrons.

Figure 21:
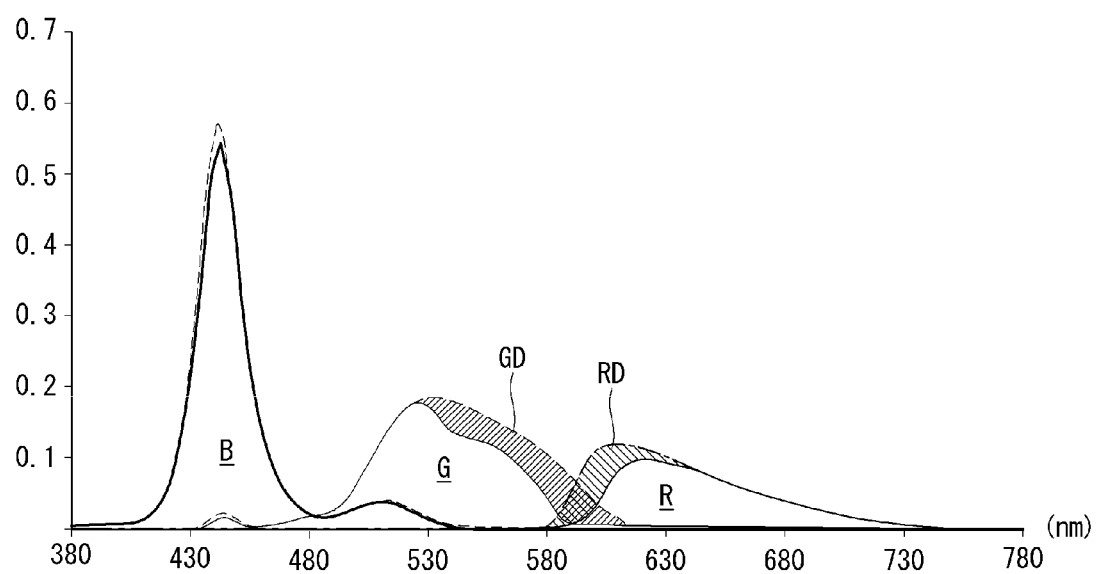
FIG. 21 is a view illustrating an example of a spectrum of light provided by a display device according to an embodiment of the present invention.

FIG. 21 is a diagram illustrating an example of a spectrum of light provided by a display device according to an embodiment of the present invention.

FIG. 21 shows the spectrum of light observed in front of the display panel 110 (see FIG. 13). A portion of the light that has passed through the light absorber 116 (see FIG. 13) can be filtered or absorbed by the light absorber 116. Therefore, among the light passing through the light absorber 116 (see FIG. 13), the green-based light and the red-based light may be distinguished from each other (dotted line or diagonal line). Whereby color purity or color reproducibility can be improved. However, the intensity of the blue-based light can be increased relative to the intensity of the green-based light and/or the red-based light. Accordingly, the color temperature of the image provided by the display panel 110 can be increased.

FIGS. 22-26 illustrate examples of optical assemblies according to an embodiment of the present invention and examples of light spectra provided by optical assemblies or backlight units.

Figure 22:
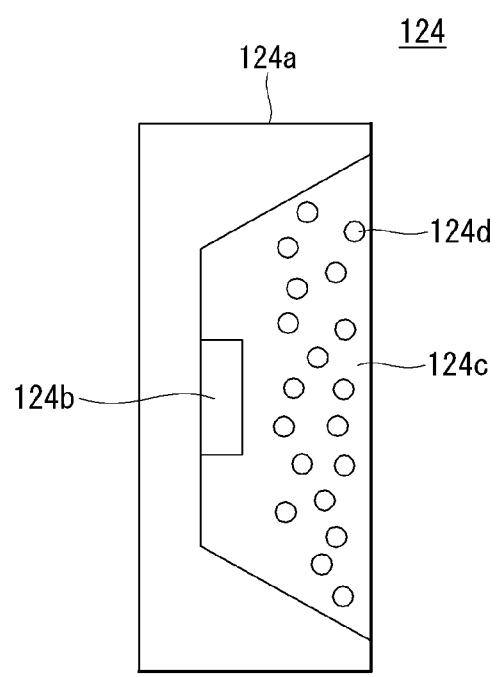
FIGS. 22 to 26 are views of examples of an optical assembly according to an embodiment of the present invention and examples of light spectra provided by an optical assembly or a backlight unit.

Referring to FIG. 22, the optical assembly 124 may include a housing 124a, a light source 124b, an encapsulant 124c, and a fluorescent substance 124d. The housing 124a can form a accommodation space. The accommodation space of the housing 124a may have a concave depressed shape. The light source 124b may be mounted in the accommodation space of the housing 124a. The light source 124b may be, for example, a blue LED. The fluorescent substance 124d can be immersed in the encapsulant 124c. The encapsulant 124c can fill the accommodation space of the housing 124a and be hardened. The fluorescent substance 124d may be distributed on a side of the light source 124b. For example, the fluorescent substance 124d may be distributed over the light source 124b. For example, the light source 124b may be positioned between the fluorescent substance 124d and the housing 124a. The fluorescent substance 124d may be in powder form. The fluorescent substance 124d may be yellow-based or red-based.

Mixing ration can be considered. For example, the proportion of the yellow-based fluorescent substance 124d may be 42 to 62%, and the proportion of the red-based fluorescent substance 124d may be 37 to 57%. The fluorescent substance 124d may be added together and mixed at a ratio of 100% within the range of the above ratio.

The content ratio can be considered. For example, the yellow-based fluorescent substance 124d may be a reference. For example, in the case that the amount of the red-based fluorescent substance 124d is as same as the amount of the yellow-based fluorescent substance 124d, the content ratio of the red-based fluorescent substance 124d to the yellow-based fluorescent substance 124d may be 1. The content ratio of the red-based fluorescent substance 124d to the yellow-based fluorescent substance 124d may be in the range of 0.71 to 0.93.

The content ratio the fluorescent substance 124d to the encapsulant 124c may be, for example, 4.2 to 6.8%.

FIGS. 23 to 26 are diagrams showing examples of light spectrums provided from an optical assembly having the fluorescent substance described with reference to FIG. 22.

Figure 23:
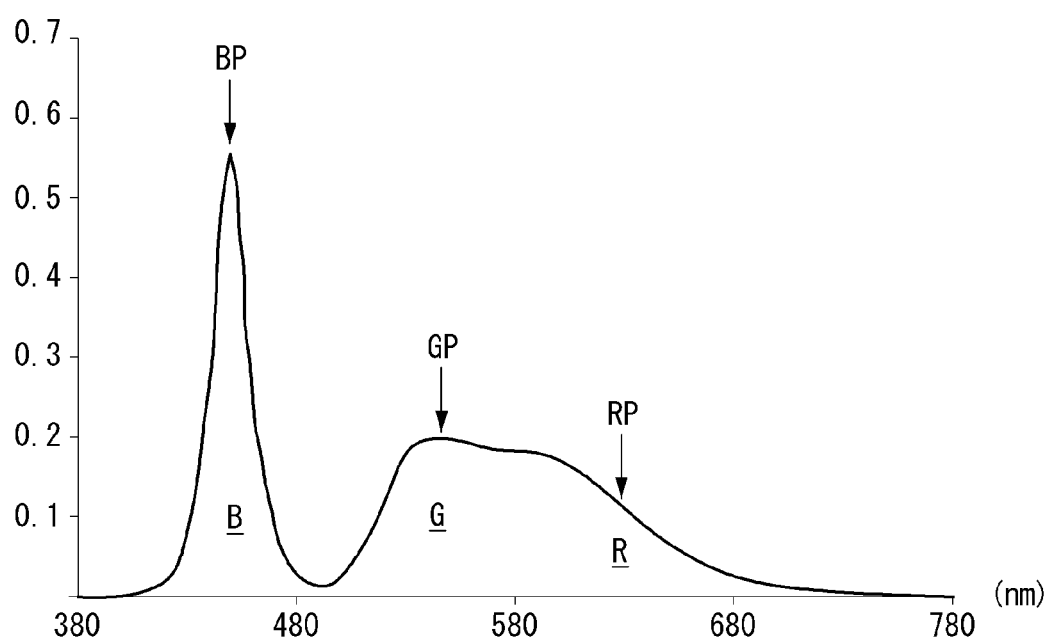

Referring to FIG. 23, the intensity GP of the green-based light G may be 36% and the intensity RP of the red-based light R may be 25%. The intensity (BP: 100%) of the blue-based light B may be a reference.

Figure 24:
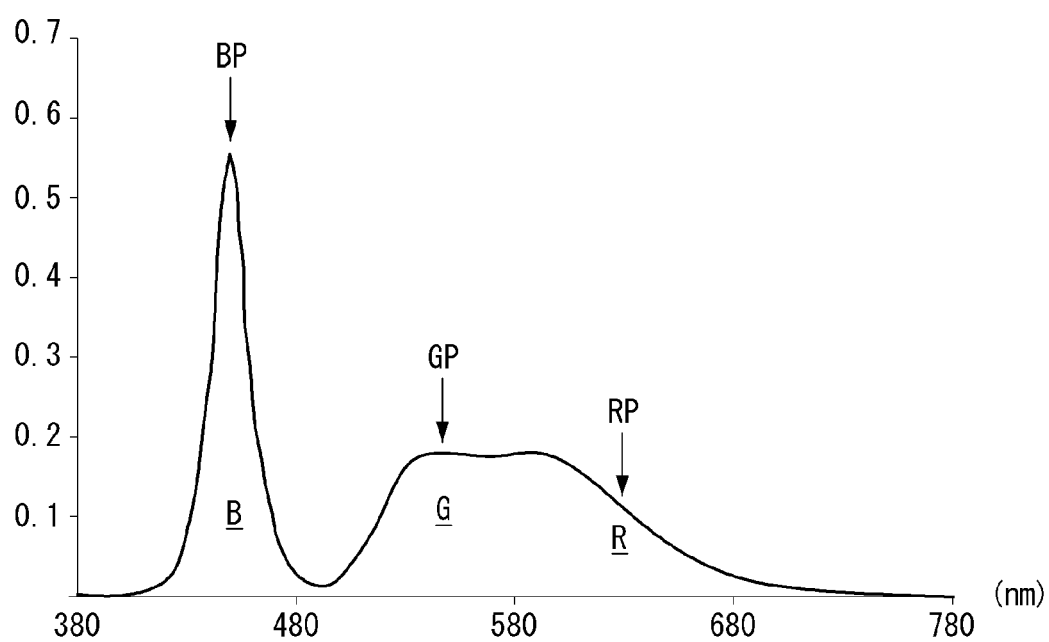

Referring to FIG. 24, the intensity GP of the green-based light G may be 33% and the intensity RP of the red-based light R may be 26%. The intensity (BP: 100%) of the blue-based light B may be a reference.

Figure 25:
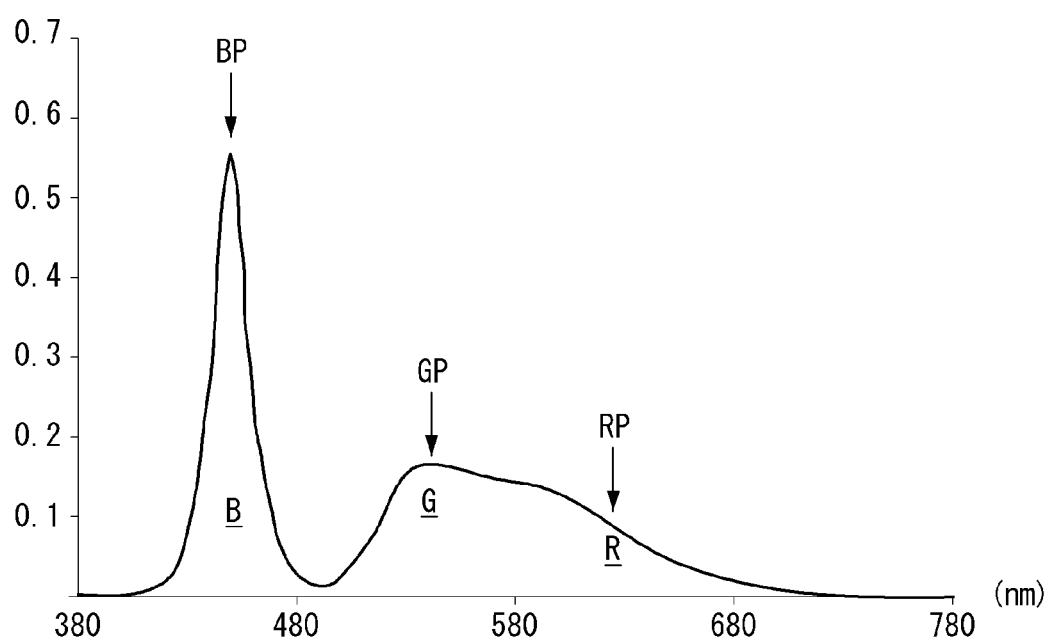

Referring to FIG. 25, the intensity GP of the green-based light G may be 30% and the intensity RP of the red-based light R may be 19%. The intensity (BP: 100%) of the blue-based light B may be a reference.

Figure 26:
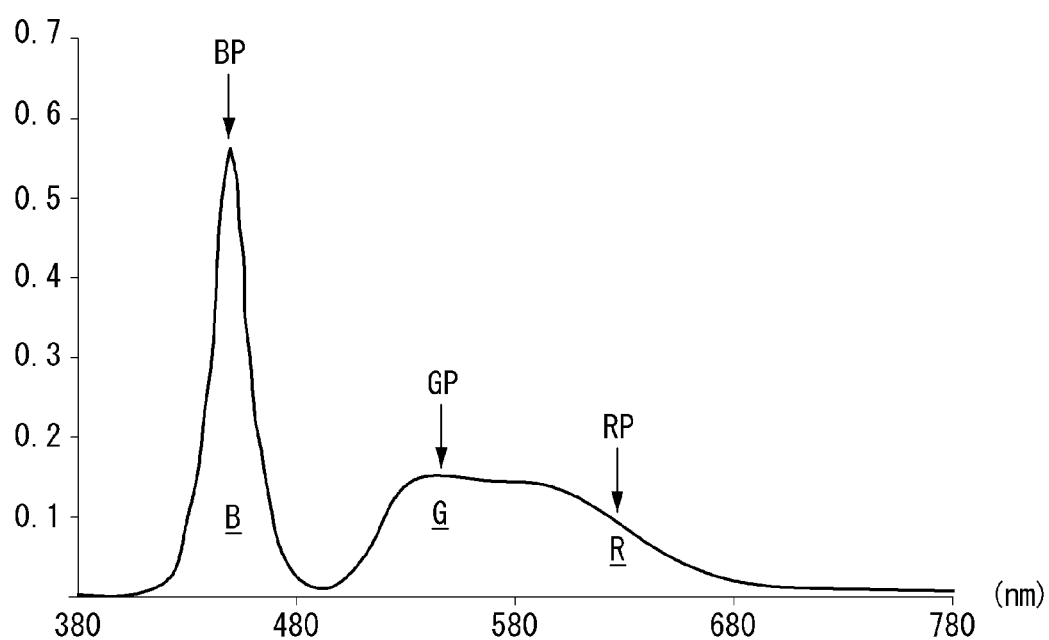

Referring to FIG. 26, the intensity GP of the green-based light G may be 28% and the intensity RP of the red-based light R may be 20%. The intensity (BP: 100%) of the blue-based light B may be a reference.

Referring to FIGS. 23 to 26, the intensity GP of the green-based light G may be 28% to 36% and the intensity RP of the red-based light R may be 19% to 26%. The intensity (BP: 100%) of the blue-based light B may be a reference.

Figure 27:
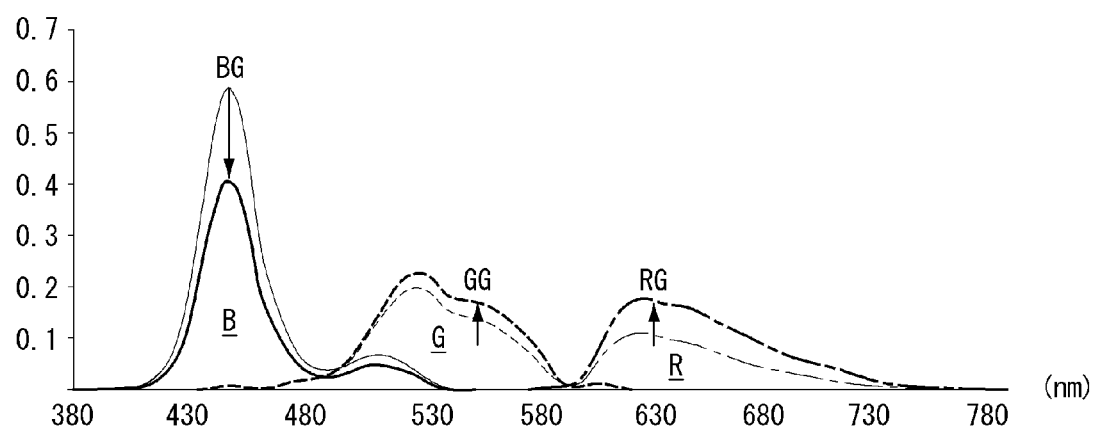
FIG. 27 is a view illustrating an example of a spectrum of light provided by a display device according to an embodiment of the present invention.

FIG. 27 is a diagram illustrating an example of a spectrum of light provided by a display device according to an embodiment of the present invention. FIG. 27 is a spectrum of light provided on the screen of the display device, and corresponds to an example of the spectrum of light resulting in the image quality of the display device.

The intensity of the blue-based light B may be decreased by a certain amount BG. The intensity of the green-based light G may be increased by a certain amount GG. The intensity of the red-based light R may be increased by a certain amount RG.

The color purity of the blue-based light B, the color purity of the green-based light G, and the purity of the red-based light R can be increased. The high color purity may mean that the color expressing power is improved. Referring to FIG. 27, the light of each color can be seen to have its intensity adjusted evenly. This may mean that a good image quality can be realized.

The display device 100 (see FIG. 1) displays various colors in combination of blue-based light B, green-based light G, and red-based light R. The blue-based light B, green-based light G, and red-based light R may be distributed separately from each other in terms of wavelength to exhibit excellent color reproducibility. Also, since the light provided by the display device 100 is not shifted to any specific color, it may be possible to realize excellent color reproducibility (which can also be expressed at an appropriate color temperature).

Figure 28:
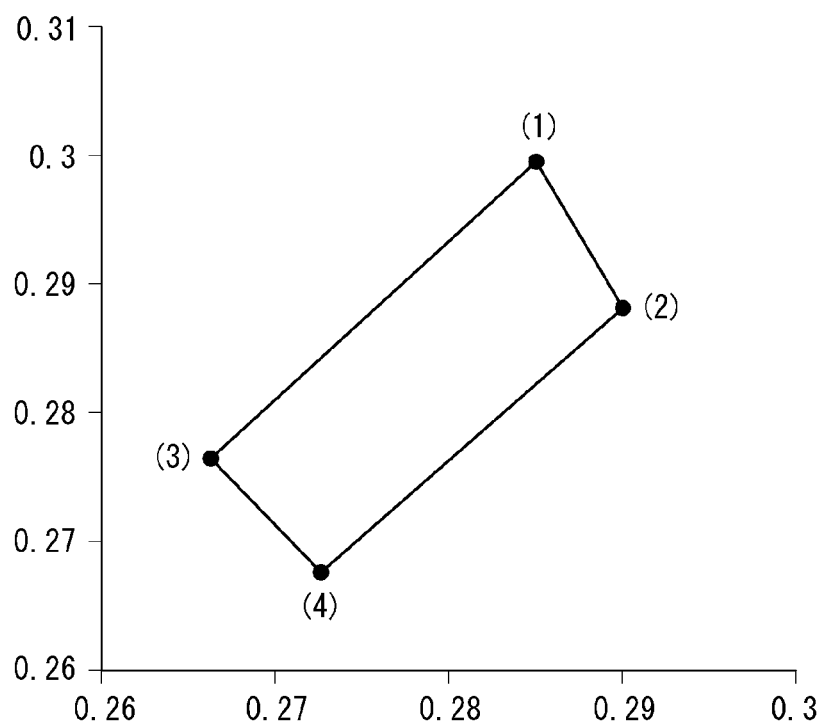
FIG. 28 is a view illustrating an example of color coordinates of light provided by a display device according to an embodiment of the present invention.

FIG. 28 is a diagram illustrating an example of a color coordinate of light provided by a display device according to an exemplary embodiment of the present invention.

The first color coordinate (1) represents the color coordinates (0.2853, 0.2994) of the image (for example, L4 in FIG. 13) with the spectrum of light described with reference to FIG. 23 provided from the display device. The second color coordinate (2) represents the color coordinates (0.2901, 0.2881) of the image with the spectrum of light described with reference to FIG. 24 provided from the display device. The third color coordinate (3) represents the color coordinates (0.2664, 0.2765) of the image with the spectrum of light described with reference to FIG. 25 provided from the display device. The fourth color coordinate (4) represents the color coordinates (0.2728, 0.2677) of the image with the spectrum of light described with reference to FIG. 26 provided from the display device. These color coordinates may indicate that the display device is displaying an image of high or good quality.

FIG. 29 is a diagram showing an example of the color temperature of light (or image, for example, L4 in FIG. 13) provided by a display device according to an embodiment of the present invention. The X-axis represents the mixing ratio (or the content ratio) of the fluorescent substance, and the Y-axis represents the color temperature. RN represents the range of the mixing ratio (or the content ratio) of the fluorescent substance determined by the above-described embodiments, and RB represents the other ranges.

The color temperature of the image displayed by the display device (for example, L4 in FIG. 13) by the light provided in the optical assembly described with reference to FIGS. 23 to 26 may be about 11,000K at the RN range. The color temperature of the image displayed by the display device by the light provided in the conventional optical assembly may be about 20,000K.

Certain embodiments or other embodiments of the invention described above are not mutually exclusive or distinct from each other. Any or all elements of the embodiments of the invention described above may be combined or combined with each other in configuration or function.

For example, a configuration "A" described in one embodiment of the invention and the drawings and a configuration "B" described in another embodiment of the invention and the drawings may be combined with each other. Namely, although the combination between the configurations is not directly described, the combination is possible except in the case where it is described that the combination is impossible.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device, comprising:
a display panel;
an optical assembly configured to supply a light to the display panel; and
a light absorbing layer is disposed between the optical assembly and the display panel and is configured to absorb a supplied light from the optical assembly in a wavelength range between 540 nm and 600 nm,
wherein the supplied light comprises a blue-based light, a green-based light, and a red-based light,
wherein an intensity of the green-based light is in a range of 25% to 38% of an intensity of the blue-based light, and
wherein an intensity of the red-based light is in a range of 14% to 32% of the intensity of the blue-based light,
wherein the optical assembly comprises a light source configured to emit the blue-based light and an encapsulant configured to cover the light source, wherein yellow and red fluorescent particles are disposed in the encapsulant,
wherein a total of the yellow and red fluorescent particles by weight is in a range of 4.2% to 6.8% of the encapsulant,
wherein a color temperature of a light emitted from the display panel is in a range of 10,000K and 12,000K,
wherein a mixing ratio of the yellow fluorescent substance to the red fluorescent substance in the encapsulant is 1: 0.71~0.93,
wherein the intensity of the green-based light is between 28% to 36% of the intensity of the blue-based light, and
wherein the intensity of the red-based light is in a range of 19% to 26% of the intensity of the blue-based light.

2. The display device of claim 1, wherein the light absorbing layer comprises Tetra Aza Porphyrin.

3. The display device of claim 1, further comprising:
a light guide plate disposed at a rear of the display panel; and
an optical sheet disposed between the display panel and the light guide plate,
wherein the optical assembly is configured to emit the light toward a lateral side of the light guide plate.

* * * * *